(12) United States Patent
Tillotson et al.

(10) Patent No.: US 11,059,564 B2
(45) Date of Patent: Jul. 13, 2021

(54) AUTOMATED DEPLOYABLE FENCES FOR AIRCRAFT WINGS

(71) Applicant: The Boeing Company, Chicago, IL (US)

(72) Inventors: Brian Tillotson, Kent, WA (US); Chris Kettering, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 308 days.

(21) Appl. No.: 16/197,927

(22) Filed: Nov. 21, 2018

(65) Prior Publication Data

US 2020/0156761 A1 May 21, 2020

(51) Int. Cl.
*B64C 3/58* (2006.01)
*B64C 5/10* (2006.01)

(52) U.S. Cl.
CPC . *B64C 3/58* (2013.01); *B64C 5/10* (2013.01)

(58) Field of Classification Search
CPC .. B64C 3/58; B64C 9/32; B64C 9/323; B64C 9/326; B64C 9/34; B64C 9/36;
(Continued)

(56) References Cited

U.S. PATENT DOCUMENTS 2,120,760 A 6/1938 Lumiere
2,885,161 A 5/1959 Kerker et al.
(Continued)

FOREIGN PATENT DOCUMENTS

EP 3053826 8/2016
EP 3150486 4/2017
(Continued)

OTHER PUBLICATIONS

European Patent Office, "Extended European Search Report," issued in connection with European Patent Application No. 19210293.7, dated Apr. 21, 2020, 5 pages.
(Continued)

*Primary Examiner* — Joshua J Michener
*Assistant Examiner* — Cindi M Curry
(74) *Attorney, Agent, or Firm* — Hanley, Flight & Zimmerman, LLC

(57) ABSTRACT

Automated deployable fences for aircraft wings are described. An example apparatus includes a fence, a latching actuator, and a biasing actuator. The fence is coupled to a wing of an aircraft. The fence is movable relative to the wing between a stowed position in which a panel of the fence extends along a skin of the wing, and a deployed position in which the panel extends at an upward angle away from the skin. The panel impedes a spanwise airflow along the wing when the fence is in the deployed position. The latching actuator is movable between a first position in which the latching actuator maintains the fence in the stowed position, and a second position in which the latching actuator releases the fence from the stowed position. The latching actuator moves from the first position to the second position in response to a control signal received at the latching actuator. The biasing actuator moves the fence from the stowed position to the deployed position in response to the latching actuator moving from the first position to the second position.

20 Claims, 26 Drawing Sheets

(STOWED)

(58) Field of Classification Search
CPC ......... B64C 5/10; B64C 23/069; B64C 23/00; B64C 21/00; F15D 1/0025; F15D 1/003; F15D 1/0035; F15D 1/004; F15D 1/0045; F15D 1/006; F15D 1/0065; F15D 1/007; F15D 1/002; F15D 1/0005
See application file for complete search history.

(56) References Cited

U.S. PATENT DOCUMENTS

| | | | |
|---|---|---|---|
| 5,570,859 | A | 11/1996 | Quandt |
| 5,895,015 | A | 4/1999 | Saiz |
| 6,105,904 | A | 8/2000 | Lisy et al. |
| 6,695,252 | B1 | 2/2004 | Dryer |
| 9,789,956 | B2 | 10/2017 | Bordoley et al. |
| 2004/0129838 | A1* | 7/2004 | Lisy .......................... B64C 3/58 244/204.1 |
| 2007/0018056 | A1 | 1/2007 | Narramore |
| 2007/0152097 | A1 | 7/2007 | Melkers et al. |
| 2008/0315623 | A1 | 12/2008 | Khalighi |
| 2010/0038492 | A1 | 2/2010 | Sclafani et al. |
| 2012/0261518 | A1 | 10/2012 | Brewer et al. |
| 2013/0209255 | A1 | 8/2013 | Pesetsky |
| 2015/0360768 | A1 | 12/2015 | Woodland |
| 2016/0053620 | A1* | 2/2016 | Gianfranceschi ....... B64C 27/72 416/1 |
| 2016/0229526 | A1 | 8/2016 | Hegenbart et al. |
| 2018/0118332 | A1 | 5/2018 | Bordoley et al. |
| 2018/0155013 | A1 | 6/2018 | Elbracht et al. |
| 2018/0162521 | A1 | 6/2018 | Langenbacher et al. |
| 2018/0370613 | A1 | 12/2018 | Van Pelt et al. |
| 2019/0002036 | A1 | 1/2019 | Stablo |
| 2020/0055585 | A1 | 2/2020 | Hung |
| 2020/0156760 | A1 | 5/2020 | Tillotson et al. |
| 2020/0156762 | A1 | 5/2020 | Tillotson et al. |
| 2020/0156763 | A1 | 5/2020 | Tillotson et al. |

FOREIGN PATENT DOCUMENTS

| | | |
|---|---|---|
| EP | 33232716 | 5/2018 |
| WO | 9950141 | 10/1999 |

OTHER PUBLICATIONS

European Patent Office, "Extended European Search Report," issued in connection with European Patent Application No. 19210284.6, dated Apr. 21, 2020, 8 pages.

European Patent Office, "Communication pursuant to Article 94(3) EPC," issued in connection with European Patent Application No. 19 210 293.7, dated Mar. 15, 2021, 3 pages.

United States Patent and Trademark Office, "Requirement for Restriction," issued in connection with U.S. Appl. No. 16/197,920, dated Dec. 30, 2020, 6 pages.

United States Patent and Trademark Office, "Non-Final Office Action," issued in connection with U.S. Appl. No. 16/197,920, dated Mar. 12, 2021, 11 pages.

United States Patent and Trademark Office, "Requirement for Restriction," issued in connection with U.S. Appl. No. 16/197,933, dated Feb. 2, 2021, 6 pages (Withdrawn).

United States Patent and Trademark Office, "Requirement for Restriction," issued in connection with U.S. Appl. No. 16/197,933, dated Feb. 9, 2021, 6 pages.

United States Patent and Trademark Office, "Requirement for Restriction," issued in connection with U.S. Appl. No. 16/197,946, dated Feb. 9, 2021, 6 pages.

United States Patent and Trademark Office, "Non-Final Office Action," issued in connection with U.S. Appl. No. 16/197,933, dated Apr. 12, 2021, 11 pages.

United States Patent and Trademark Office, "Non-Final Office Action," issued in connection with U.S. Appl. No. 16/197,946, dated Apr. 13, 2021, 11 pages.

United States Patent and Trademark Office, "Notice of Allowance and Fee(s) Due," issued in connection with U.S. Appl. No. 16/197,920, dated Apr. 19, 2021, 8 pages.

United States Patent and Trademark Office, "Corrected Notice of Allowability," issued in connection with U.S. Appl. No. 16/197,920, dated May 10, 2021, 2 pages.

United States Patent and Trademark Office, "Notice of Allowance and Fee(s) Due," issued in connection with U.S. Appl. No. 16/197,933, dated May 26, 2021, 8 pages.

* cited by examiner (STOWED)

(DEPLOYED)

(STOWED)

(DEPLOYED)

(DEPLOYED)

(DEPLOYED)

(STOWED)

(DEPLOYED)

FIG. 13 (STOWED)

(STOWED)

(DEPLOYED)

FIG. 18 (DEPLOYED)

(DEPLOYED)

FIG. 20 (DEPLOYED)

(STOWED)

(STOWED)

(DEPLOYED)

(STOWED)

(DEPLOYED)

US 11,059,564 B2

AUTOMATED DEPLOYABLE FENCES FOR AIRCRAFT WINGS

FIELD OF THE DISCLOSURE

This disclosure relates generally to fences for aircraft wings and, more specifically, to automated deployable fences for aircraft wings.

BACKGROUND

Fences can be implemented on the wings of an aircraft (e.g., a swept-wing aircraft) to impede (e.g., block) spanwise airflows along the wings, thereby improving the handling of the aircraft at reduced speeds (e.g., a lower speed during a takeoff and/or landing operation of the aircraft relative to a higher speed during a cruise operation of the aircraft). Conventional fences are located on and/or arranged in a generally chordwise direction along the topsides of the wings of the aircraft.

Some conventional fences are fixed in place on and/or non-movably coupled to the wings of the aircraft, thereby causing such conventional fences to generate and/or produce drag during the entirety of a flight of the aircraft (e.g., during a takeoff operation, during a cruise operation, and during a landing operation). Other conventional fences are deployable and/or retractable between a vertical deployed position extending upwardly from the wings of the aircraft and a vertical stowed position within the airfoils of the wings of the aircraft, but typically require space-consuming mechanical linkages to actuate such movements of the fences, with such mechanical linkages being under the control of a pilot of the aircraft.

SUMMARY

Example automated (e.g., controllable) deployable fences for aircraft wings are disclosed herein. In some examples, an apparatus is disclosed. In some disclosed examples, the apparatus comprises a fence, a latching actuator, and a biasing actuator. In some disclosed examples, the fence is coupled to a wing of an aircraft. In some disclosed examples, the fence is movable relative to the wing between a stowed position in which a panel of the fence extends along a skin of the wing, and a deployed position in which the panel extends at an upward angle away from the skin. In some disclosed examples, the panel is configured to impede a spanwise airflow along the wing when the fence is in the deployed position. In some disclosed examples, the latching actuator is movable between a first position in which the latching actuator maintains the fence in the stowed position, and a second position in which the latching actuator releases the fence from the stowed position. In some disclosed examples, the latching actuator is configured to move from the first position to the second position in response to a control signal received at the latching actuator. In some disclosed examples, the biasing actuator is configured to move the fence from the stowed position to the deployed position in response to the latching actuator being moved from the first position to the second position.

In some examples, a method for moving a fence coupled to a wing of an aircraft is disclosed. In some disclosed examples, the method comprises moving the fence between a stowed position in which a panel of the fence extends along a skin of the wing, and a deployed position in which the panel extends at an upward angle away from the skin. In some disclosed examples, the panel impedes a spanwise airflow along the wing when the fence is in the deployed position. In some disclosed examples, the moving of the fence includes moving a latching actuator from (a) a first position in which the latching actuator maintains the fence in the stowed position to (b) a second position in which the latching actuator releases the fence from the stowed position. In some disclosed examples, the moving of the latching actuator is in response to a control signal received at the latching actuator. In some disclosed examples, the moving of the fence includes moving the fence from the stowed position to the deployed position via a biasing actuator in response to the moving of the latching actuator from the first position to the second position.

Figure 1:
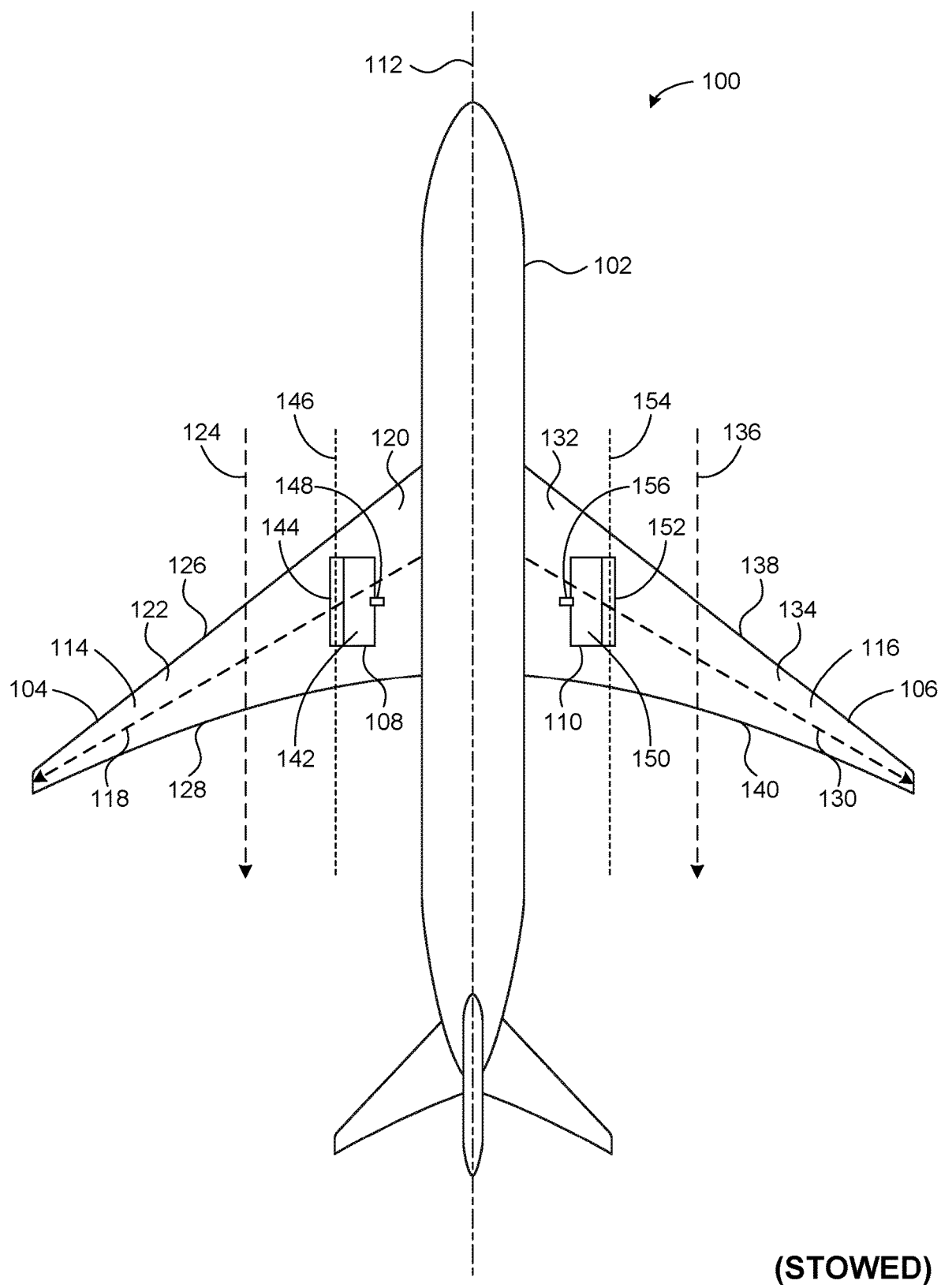
FIG. 1 illustrates an example aircraft in which example automated deployable fences can be implemented in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Fences can be implemented on the wings of an aircraft (e.g., a swept-wing aircraft) to impede (e.g., block) spanwise airflows along the wings, thereby improving the handling of the aircraft at reduced speeds (e.g., a lower speed during a takeoff and/or landing operation of the aircraft relative to a higher speed during a cruise operation of the aircraft). Conventional fences implemented on the wings of an aircraft typically have substantial wetted areas that generate and/or produce drag while the aircraft is in flight.

Some conventional fences are fixed in place on and/or non-movably coupled to the wings of the aircraft, thereby causing such conventional fences to generate and/or produce drag during the entirety of a flight of the aircraft (e.g., during a takeoff operation, during a cruise operation, and during a landing operation). While implementing such conventional fences on the wings of an aircraft to impede spanwise airflows along the wings can advantageously improve the handling of the aircraft during low-speed operation (e.g., during takeoff and/or landing), this advantage does not come without drawbacks. For example, the presence of such conventional fences can give rise to undesirable aerodynamic performance penalties (e.g., drag) during high-speed operation of the aircraft (e.g., during cruise).

Other conventional fences are movable (e.g., deployable and/or retractable) between a vertical deployed position extending upwardly from the wings of the aircraft and a vertical stowed position within the airfoils of the wings of the aircraft. While implementing such movable conventional fences on the wings of an aircraft to impede spanwise airflows along the wings can advantageously improve the handling of the aircraft during low-speed operation (e.g., during takeoff and/or landing), this advantage again does not come without drawbacks. For example, such movable conventional fences typically require space-consuming in-wing mechanical linkages to actuate and/or move the fences between their respective deployed and stowed positions, with such mechanical linkages being under the control of a pilot of the aircraft.

Absent the implementation of conventional fences as described above, an aircraft typically requires the implementation of one or more other countermeasure(s) to mitigate spanwise airflows along the wings of the aircraft during low-speed operation. Known countermeasures undesirably increase the costs associated with designing, testing, installing and/or otherwise implementing the wings and/or, more generally, the aircraft.

Unlike the conventional fences and/or other countermeasures described above, example deployable fences disclosed herein are automated (e.g., controllable) via a latching actuator and a biasing actuator. In some disclosed examples, a deployable fence is coupled (e.g., rotatably coupled) to a wing of an aircraft such that the fence is movable relative to the wing between a stowed position in which a panel of the fence extends along a skin of the wing, and a deployed position in which the panel extends at an upward angle away from the skin. The panel is configured to impact the airflow around the aircraft when the fence is in the deployed position. For example, the panel can impede a spanwise airflow along the wing when the fence is in the deployed position. As another example, the panel can initiate and/or generate a vortex along the wing when the fence is in the deployed position. In some disclosed examples, a latching actuator is movable between a first position in which the latching actuator maintains the fence in the stowed position, and a second position in which the latching actuator releases the fence from the stowed position. The latching actuator is configured to move from the first position to the second position in response to a control signal (e.g., an electronic control signal) received at the latching actuator. In some disclosed examples, a biasing actuator is configured to move the fence from the stowed position to the deployed position in response to the latching actuator being moved from the first position to the second position.

The example automated (e.g., controllable) deployable fences disclosed herein provide numerous advantages over the conventional fences described above. For example, the movability (e.g., movement from a deployed position to a stowed position) of the automated deployable fences disclosed herein advantageously reduces undesirable aerodynamic performance penalties (e.g., drag) during high-speed operation of the aircraft (e.g., during cruise). As another example, the automated deployable fences disclosed herein provide a stowed position for the fence whereby the fence extends along the skin of the wing (as opposed to vertically within the wing), thereby advantageously increasing the amount of unused space within the wing relative to the amount of space that may otherwise be consumed by the in-wing mechanical linkages associated with the above-described vertically-deployable conventional fences. As yet another example, the automated deployable fences disclosed herein facilitate pilot-free operation (e.g., deployment and retraction) of the fences, which advantageously ensures that the fences are deployed and/or retracted at the appropriate time(s) and/or under the appropriate flight condition(s).

Figure 2:
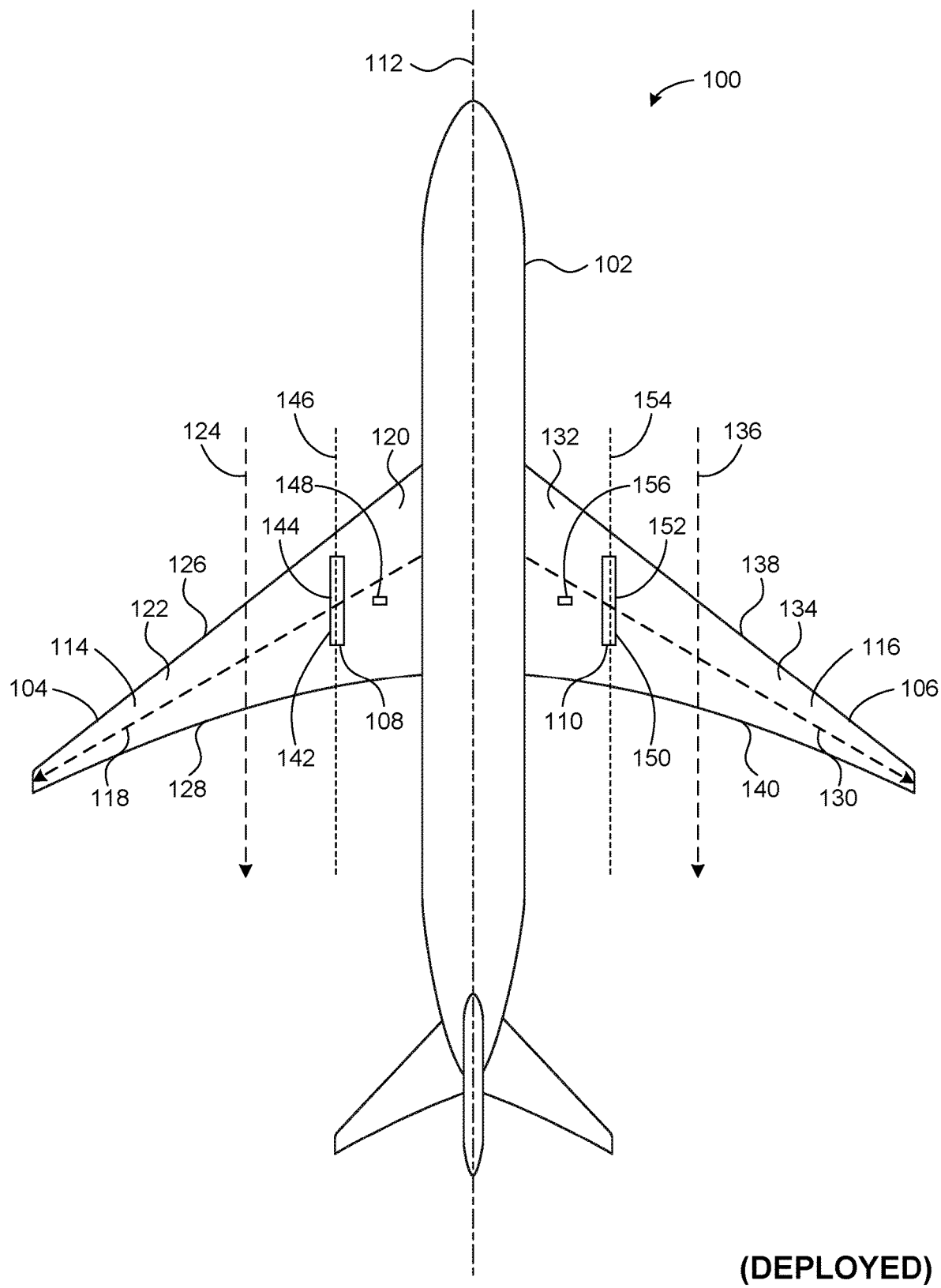
FIG. 2 illustrates the example aircraft of FIG. 1 with the example automated deployable fences of FIG. 1 deployed.

FIG. 1 illustrates an example aircraft 100 in which example automated deployable fences can be implemented in accordance with teachings of this disclosure. FIG. 1 illustrates the example aircraft 100 of FIG. 1 with the example automated deployable fences of FIG. 1 stowed. FIG. 2 illustrates the example aircraft 100 of FIG. 1 with the example automated deployable fences of FIG. 1 deployed. The aircraft 100 can be any form and/or type of aircraft including, for example, a civil (e.g., business or commercial) aircraft, a military aircraft, a manned (e.g., piloted) aircraft, an unmanned aircraft (e.g., a drone), etc. In the illustrated example of FIGS. 1 and 2, the aircraft 100 includes an example fuselage 102, a first example wing 104 (e.g., a left-side wing), a second example wing 106 (e.g., a right-side wing), a first example fence 108 (e.g., a left-side fence), and a second example fence 110 (e.g., a right-side fence). Although the illustrated example of FIGS. 1 and 2 depicts only a single fence located on each wing of the aircraft 100 (e.g., the first fence 108 located on the first wing 104, and the second fence 110 located on the second wing 106), other example implementations can include multiple (e.g., 2, 3, 4, etc.) fences located on each wing of the aircraft 100. In some examples, the location(s), size(s), and/or shape(s) of respective ones of the fences (e.g., the first fence 108 and the second fence 110) of the aircraft 100 can differ relative to the location(s), size(s) and/or shape(s) of the fences shown in FIGS. 1 and 2.

The fuselage 102 of FIGS. 1 and 2 has a generally cylindrical shape that defines an example longitudinal axis 112 of the aircraft 100. The first wing 104 and the second wing 106 of FIGS. 1 and 2 are respectively coupled to the fuselage 102 and swept in a rearward direction of the aircraft 100. The first wing 104 includes an example skin 114 forming (e.g., forming all or part of) an outer surface of the first wing 104, and the second wing 106 includes an example skin 116 forming (e.g., forming all or part of) an outer surface of the second wing 106.

The first wing 104 of FIGS. 1 and 2 defines an example spanwise direction 118 moving from an example inboard portion 120 (e.g., inboard relative to the spanwise location of the first fence 108) of the first wing 104 toward an example outboard portion 122 (e.g., outboard relative to the spanwise location of the first fence 108) of the first wing 104. The spanwise direction 118 defined by the first wing 104 is representative of a direction of a spanwise airflow that may occur along the first wing 104. The first wing 104 also defines an example chordwise direction 124 moving from an example leading edge 126 of the first wing 104 toward an example trailing edge 128 of the first wing 104. The chordwise direction 124 defined by the first wing 104 is representative of a direction of a chordwise airflow (e.g., a cruise airflow) that may occur along the first wing 104.

The second wing 106 of FIGS. 1 and 2 defines an example spanwise direction 130 moving from an example inboard portion 132 (e.g., inboard relative to the spanwise location of the second fence 110) of the second wing 106 toward an example outboard portion 134 (e.g., outboard relative to the spanwise location of the second fence 110) of the second wing 106. The spanwise direction 130 defined by the second wing 106 is representative of a direction of a spanwise airflow that may occur along the second wing 106. The second wing 106 also defines an example chordwise direction 136 moving from an example leading edge 138 of the second wing 106 toward an example trailing edge 140 of the second wing 106. The chordwise direction 136 defined by the second wing 106 is representative of a direction of a chordwise airflow (e.g., a cruise airflow) that may occur along the second wing 106.

The first fence 108 of FIGS. 1 and 2 is rotatably coupled to the first wing 104 such that the first fence 108 is movable (e.g., rotatable) between the stowed position shown in FIG. 1 and the deployed position shown in FIG. 2. The first fence 108 includes an example panel 142. In the illustrated example of FIGS. 1 and 2, the panel 142 of the first fence 108 extends (e.g., in an inboard direction toward the longitudinal axis 112) along the skin 114 of the first wing 104 when the first fence 108 is in the stowed position shown in FIG. 1. In some examples, the panel 142 of the first fence 108 extends along and is positioned over and/or on top of the skin 114 of the first wing 104 when the first fence 108 is in the stowed position shown in FIG. 1. In other examples, the panel 142 of the first fence 108 extends along and is recessed (e.g., fully or partially recessed) relative to the skin 114 of the first wing 104 when the first fence 108 is in the stowed position shown in FIG. 1.

The panel 142 of the first fence 108 extends at an upward angle (e.g., vertically) away from the skin 114 of the first wing 104 when the first fence 108 is in the deployed position shown in FIG. 2. The panel 142 of the first fence 108 is configured to impact the airflow around the aircraft 100 when the first fence 108 is in the deployed position shown in FIG. 2. For example, the panel 142 can impede a spanwise airflow occurring along the spanwise direction 118 of the first wing 104 when the first fence 108 is in the deployed position shown in FIG. 2. As another example, the panel 142 can initiate and/or generate a vortex along the first wing 104 when the first fence 108 is in the deployed position shown in FIG. 2.

The panel 142 and/or, more generally, the first fence 108 of FIGS. 1 and 2 is rotatably coupled to the first wing 104 of FIGS. 1 and 2 via an example axle 144 having an example central axis 146. In the illustrated example of FIGS. 1 and 2, the central axis 146 of the axle 144 is parallel to the chordwise direction 124 of the first wing 104. In other examples, the central axis 146 of the axle 144 can be canted (e.g., at a toe-in angle or a toe-out angle) relative to the chordwise direction 124 of the first wing 104. For example, the central axis 146 of the axle 144 can be canted at a toe-in angle relative to the chordwise direction 124 of the first wing 104 such that a first end of the axle 144 positioned toward the leading edge 126 of the first wing 104 is located closer to the longitudinal axis 112 of the aircraft 100 than is a second end of the axle 144 positioned toward the trailing edge 128 of the first wing 104. As another example, the central axis 146 of the axle 144 can be canted at a toe-out angle relative to the chordwise direction 124 of the first wing 104 such that a first end of the axle 144 positioned toward the leading edge 126 of the first wing 104 is located further away from the longitudinal axis 112 of the aircraft 100 than is a second end of the axle 144 positioned toward the trailing edge 128 of the first wing 104.

The first fence 108 of FIGS. 1 and 2 is configured to move from the stowed position shown in FIG. 1 to the deployed position shown in FIG. 2 via a latching actuator and a biasing actuator associated with the first fence 108. In the illustrated example of FIGS. 1 and 2, an example latching actuator 148 is movable between a first position (e.g., an engaged position) in which the latching actuator 148 maintains the first fence 108 in the stowed position shown in FIG. 1, and a second position (e.g., a disengaged position) in which the latching actuator 148 releases the first fence 108 from the stowed position shown in FIG. 1. A biasing actuator operatively coupled to the first fence 108 biases the first fence 108 to move from the stowed position shown in FIG. 1 to the deployed position shown in FIG. 2. The biasing actuator is configured to move the first fence 108 from the stowed position shown in FIG. 1 to the deployed position shown in FIG. 2 in response to the latching actuator 148 being moved from the first position (e.g., engaged position) to the second position (e.g., disengaged position). Example means for implementing the latching actuator 148 and the biasing actuator associated with the first fence 108 are described below in connection with FIGS. 3-10.

In the illustrated example of FIGS. 1 and 2, the latching actuator 148 associated with the first fence 108 is configured to move from the first position (e.g., engaged position) to the second position (e.g., disengaged position) in response to a control signal received at the latching actuator 148 from a controller of a flight control system of the aircraft 100. The flight control system includes one or more sensor(s) configured to detect one or more operational characteristic(s) of the aircraft 100 including, for example, an airspeed, an angle of attack, and/or an airflow angle. In some examples, the controller is configured to transmit the control signal to the latching actuator 148 of FIGS. 1 and 2 in response to the controller determining that one or more of the operational characteristic(s) violate(s) and/or fail(s) to satisfy one or more corresponding threshold(s). In some examples, the flight control system includes a user interface configured to present data corresponding to the operational characteristic(s) detected by the sensor(s). In some examples, the controller is configured to transmit the control signal to the latching actuator 148 of FIGS. 1 and 2 in response to the controller receiving an actuation command from the user interface of the flight control system. Example means for implementing the flight control system of the aircraft 100 are described below in connection with FIG. 26.

In some examples, the latching actuator 148 associated with the first fence 108 is configured to be maintained in the first position (e.g., engaged position) shown in FIG. 1 during a cruise operation of the aircraft 100 having a first speed, and the latching actuator 148 is further configured to move from the first position (e.g., engaged position) shown in FIG. 1 to the second position (e.g., disengaged position) shown in FIG. 2 during a reduced speed operation (e.g., a takeoff or landing operation) of the aircraft 100 having a second speed less than the first speed.

The second fence 110 of FIGS. 1 and 2 is rotatably coupled to the second wing 106 such that the second fence 110 is movable (e.g., rotatable) between the stowed position shown in FIG. 1 and the deployed position shown in FIG. 2. The second fence 110 includes an example panel 150. In the illustrated example of FIGS. 1 and 2, the panel 150 of the second fence 110 extends (e.g., in an inboard direction toward the longitudinal axis 112) along the skin 116 of the second wing 106 when the second fence 110 is in the stowed position shown in FIG. 1. In some examples, the panel 150 of the second fence 110 extends along and is positioned over and/or on top of the skin 116 of the second wing 106 when the second fence 110 is in the stowed position shown in FIG. 1. In other examples, the panel 150 of the second fence 110 extends along and is recessed (e.g., fully or partially recessed) relative to the skin 116 of the second wing 106 when the second fence 110 is in the stowed position shown in FIG. 1.

The panel 150 of the second fence 110 extends at an upward angle (e.g., vertically) away from the skin 116 of the second wing 106 when the second fence 110 is in the deployed position shown in FIG. 2. The panel 150 of the second fence 110 is configured to impact the airflow around the aircraft 100 when the second fence 110 is in the deployed position shown in FIG. 2. For example, the panel 150 can impede a spanwise airflow occurring along the spanwise direction 130 of the second wing 106 when the second fence 110 is in the deployed position shown in FIG. 2. As another example, the panel 150 can initiate and/or generate a vortex along the second wing 106 when the second fence 110 is in the deployed position shown in FIG. 2.

The panel 150 and/or, more generally, the second fence 110 of FIGS. 1 and 2 is rotatably coupled to the second wing 106 of FIGS. 1 and 2 via an example axle 152 having an example central axis 154. In the illustrated example of FIGS. 1 and 2, the central axis 154 of the axle 152 is parallel to the chordwise direction 136 of the second wing 106. In other examples, the central axis 154 of the axle 152 can be canted (e.g., at a toe-in angle or a toe-out angle) relative to the chordwise direction 136 of the second wing 106. For example, the central axis 154 of the axle 152 can be canted at a toe-in angle relative to the chordwise direction 136 of the second wing 106 such that a first end of the axle 152 positioned toward the leading edge 138 of the second wing 106 is located closer to the longitudinal axis 112 of the aircraft 100 than is a second end of the axle 152 positioned toward the trailing edge 140 of the second wing 106. As another example, the central axis 154 of the axle 152 can be canted at a toe-out angle relative to the chordwise direction 136 of the second wing 106 such that a first end of the axle 152 positioned toward the leading edge 138 of the second wing 106 is located further away from the longitudinal axis 112 of the aircraft 100 than is a second end of the axle 152 positioned toward the trailing edge 140 of the second wing 106.

The second fence 110 of FIGS. 1 and 2 is configured to move from the stowed position shown in FIG. 1 to the deployed position shown in FIG. 2 via a latching actuator and a biasing actuator associated with the second fence 110. In the illustrated example of FIGS. 1 and 2, an example latching actuator 156 is movable between a first position (e.g., an engaged position) in which the latching actuator 156 maintains the second fence 110 in the stowed position shown in FIG. 1, and a second position (e.g., a disengaged position) in which the latching actuator 156 releases the second fence 110 from the stowed position shown in FIG. 1. A biasing actuator operatively coupled to the second fence 110 biases the second fence 110 to move from the stowed position shown in FIG. 1 to the deployed position shown in FIG. 2. The biasing actuator is configured to move the second fence 110 from the stowed position shown in FIG. 1 to the deployed position shown in FIG. 2 in response to the latching actuator 156 being moved from the first position (e.g., engaged position) to the second position (e.g., disengaged position). Example means for implementing the latching actuator 156 and the biasing actuator associated with the second fence 110 are described below in connection with FIGS. 3-10.

In the illustrated example of FIGS. 1 and 2, the latching actuator 156 associated with the second fence 110 is configured to move from the first position (e.g., engaged position) to the second position (e.g., disengaged position) in response to a control signal received at the latching actuator 156 from a controller of a flight control system of the aircraft 100. The flight control system includes one or more sensor(s) configured to detect one or more operational characteristic(s) of the aircraft 100 including, for example, an airspeed, an angle of attack, and/or an airflow angle. In some examples, the controller is configured to transmit the control signal to the latching actuator 156 of FIGS. 1 and 2 in response to the controller determining that one or more of the operational characteristic(s) violate(s) and/or fail(s) to satisfy one or more corresponding threshold(s). In some examples, the flight control system includes a user interface configured to present data corresponding to the operational characteristic(s) detected by the sensor(s). In some examples, the controller is configured to transmit the control signal to the latching actuator 156 of FIGS. 1 and 2 in response to the controller receiving an actuation command from the user interface of the flight control system. Example means for implementing the flight control system of the aircraft 100 are described below in connection with FIG. 26.

In some examples, the latching actuator 156 associated with the second fence 110 is configured to be maintained in the first position (e.g., engaged position) shown in FIG. 1 during a cruise operation of the aircraft 100 having a first speed, and the latching actuator 156 is further configured to move from the first position (e.g., engaged position) shown in FIG. 1 to the second position (e.g., disengaged position) shown in FIG. 2 during a reduced speed operation (e.g., a takeoff or landing operation) of the aircraft 100 having a second speed less than the first speed.

Figure 3:
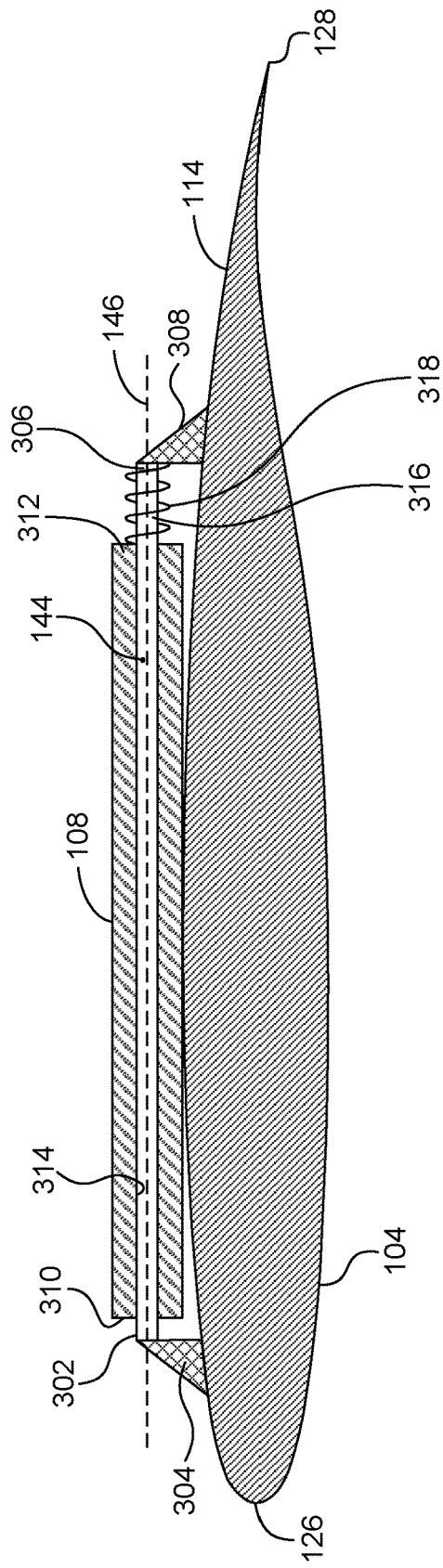
FIG. 3 is a cross-sectional view of the first example fence of FIGS. 1 and 2 looking inboard and taken across the example central axis of the example axle, with the first fence in the example stowed position of FIG. 1.
Figure 4:
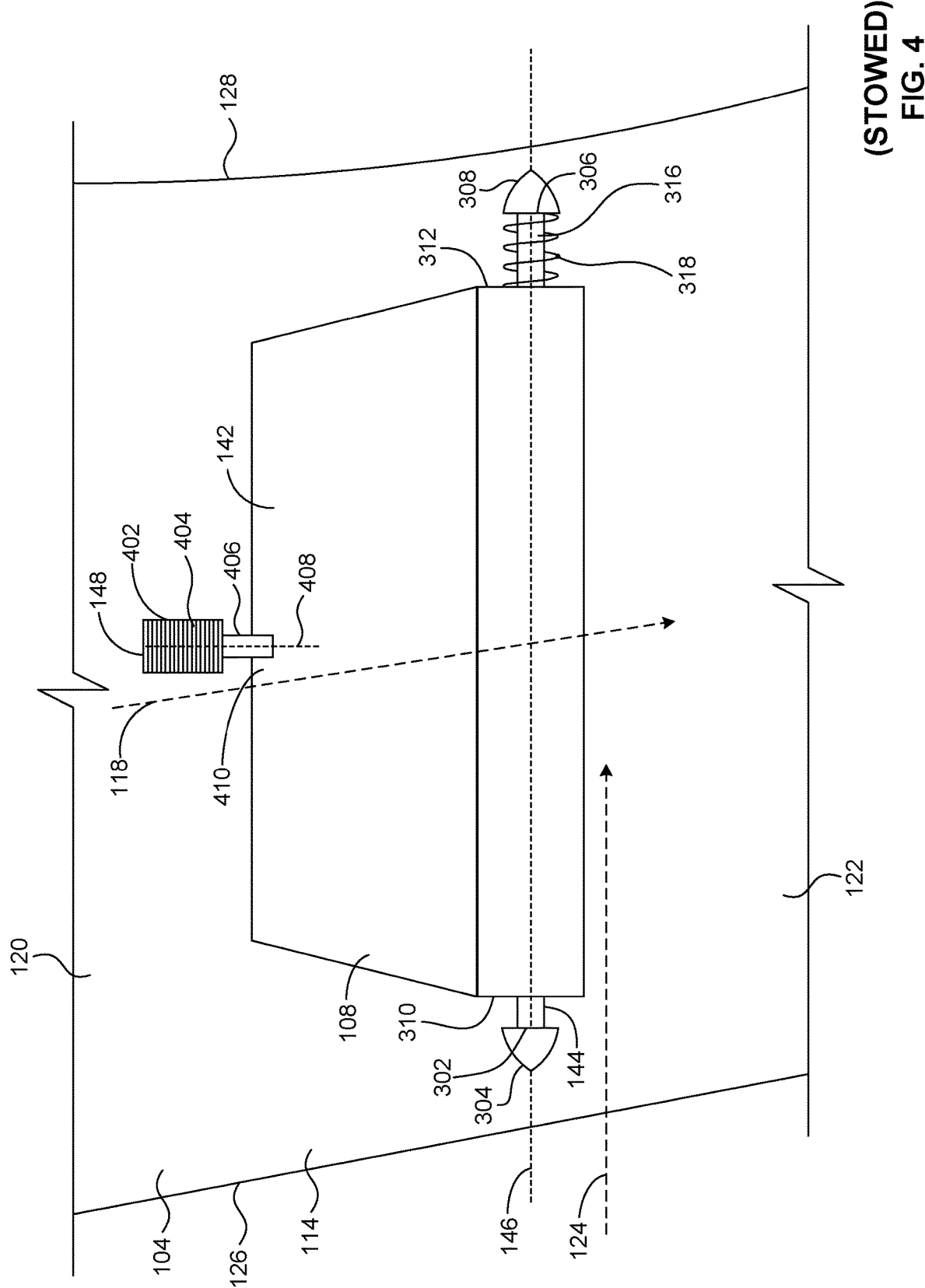
FIG. 4 is a plan view of the first example fence of FIGS. 1-3 in the example stowed position of FIGS. 1 and 3.
Figure 5:
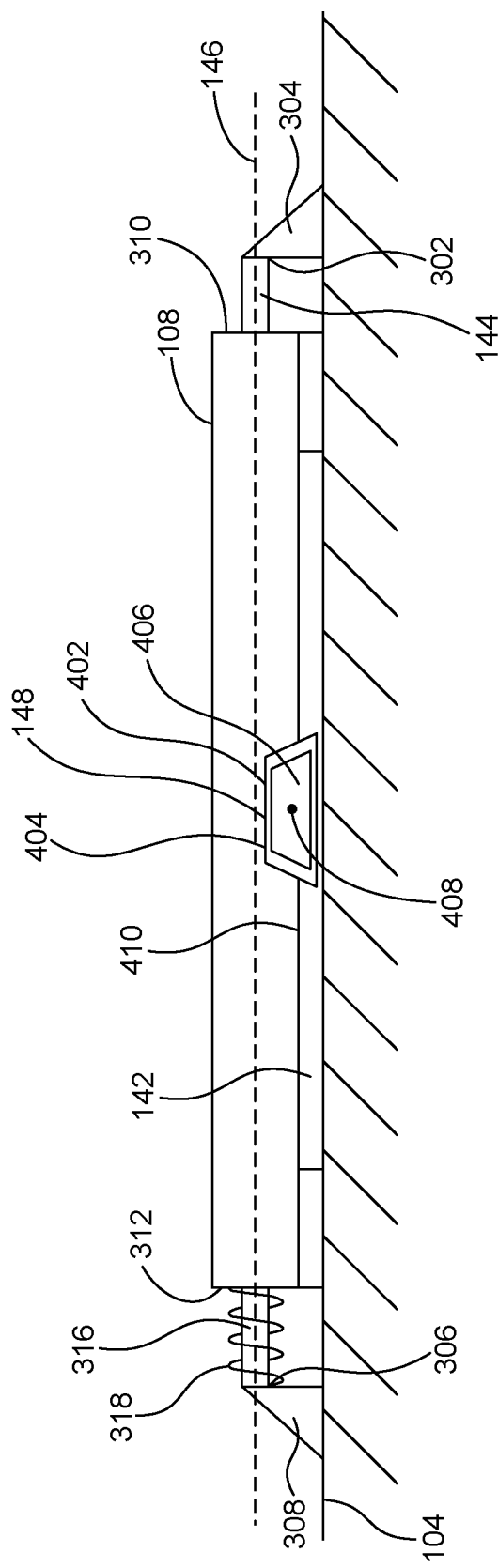
FIG. 5 is a side view of the first example fence of FIGS. 1-4 looking outboard from the example inboard portion of the first example wing, with the first fence in the example stowed position of FIGS. 1, 3 and 4.
Figure 6:
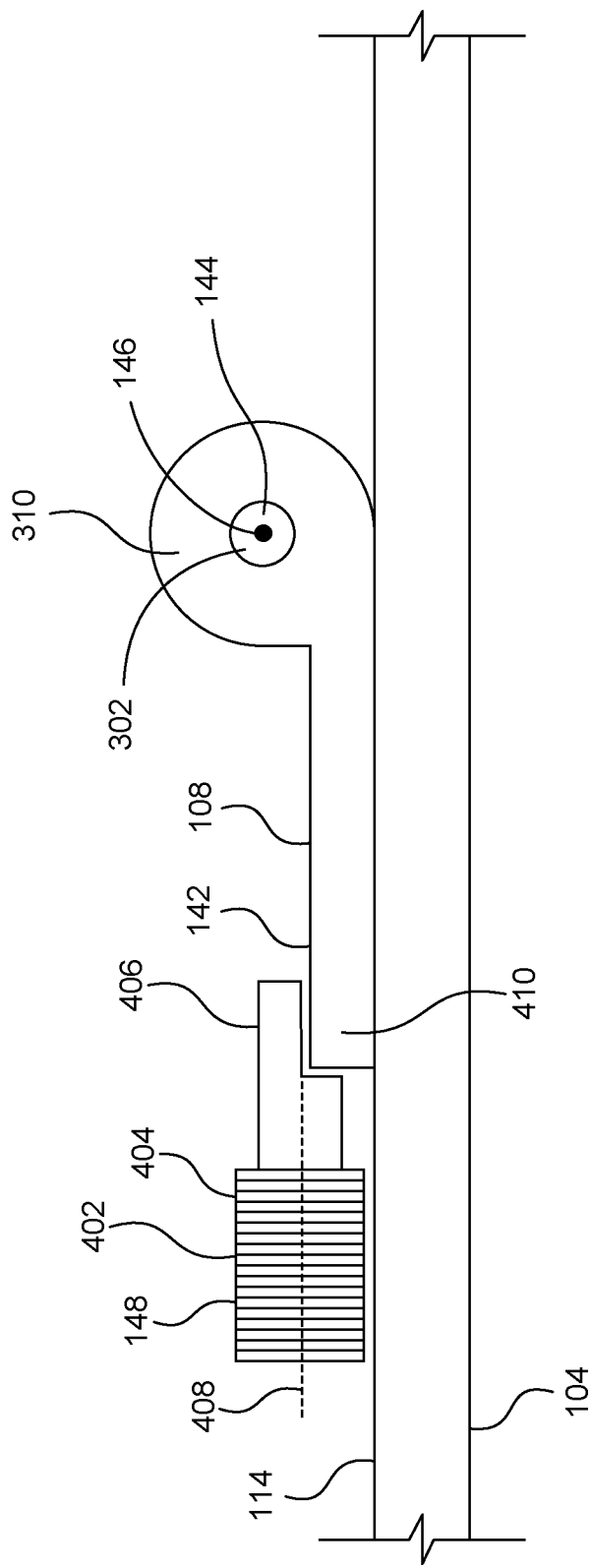
FIG. 6 is a frontal view of the first example fence of FIGS. 1-5 looking rearward along the example central axis of the example axle, with the first fence in the example stowed position of FIGS. 1 and 3-5.
Figure 7:
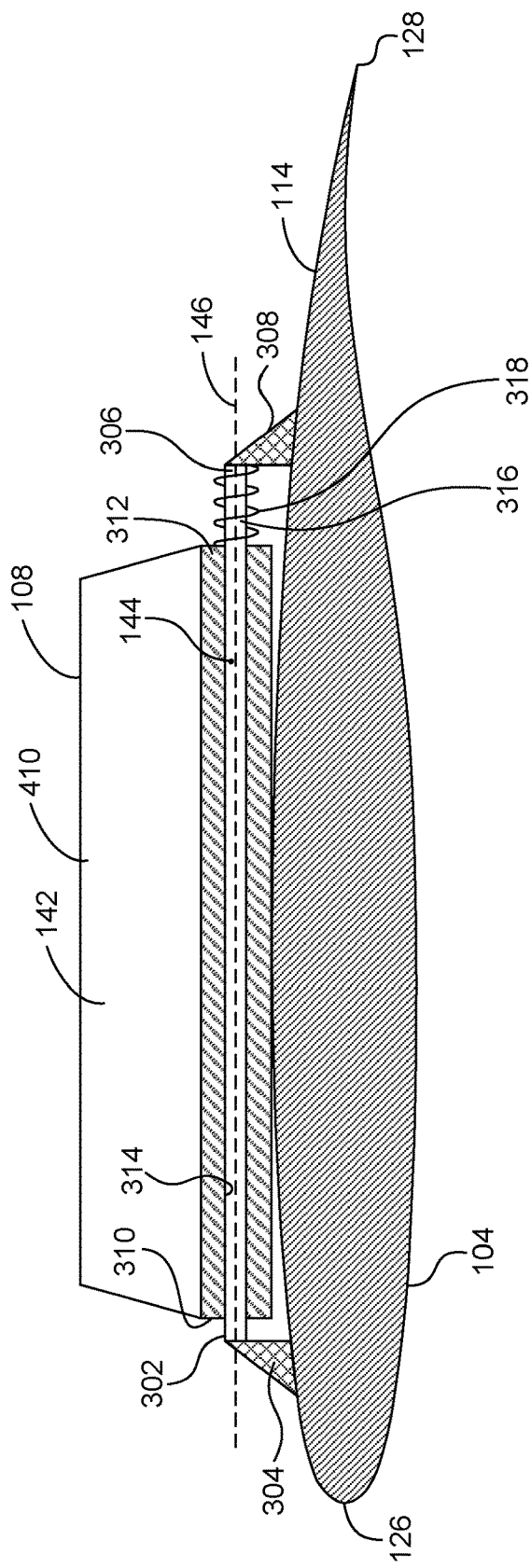
FIG. 7 is a cross-sectional view of the first example fence of FIGS. 1-6 looking inboard and taken across the example central axis of the example axle, with the first fence in the example deployed position of FIG. 2.
Figure 8:
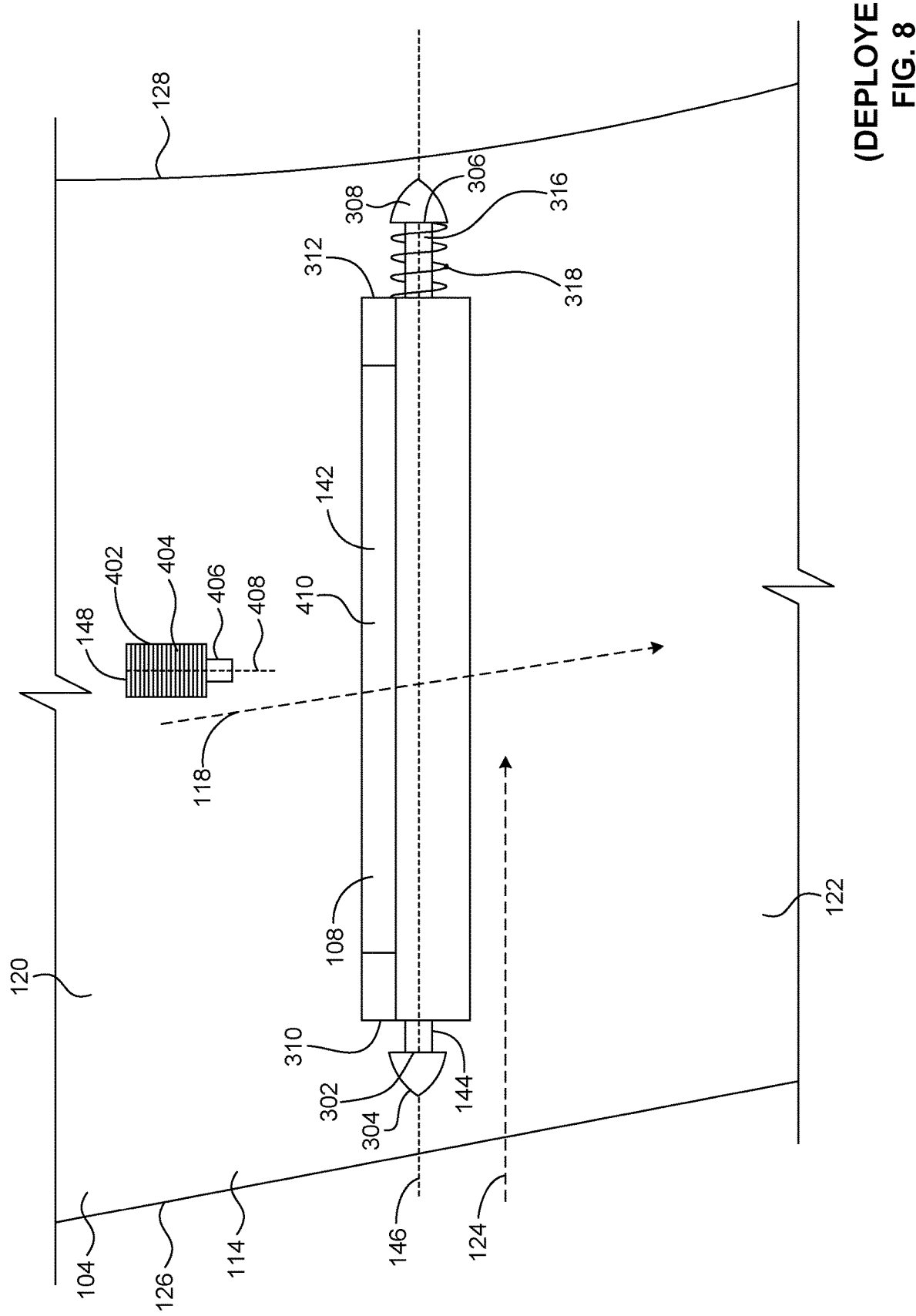
FIG. 8 is a plan view of the first example fence of FIGS. 1-7 in the example deployed position of FIGS. 2 and 7.
Figure 9:
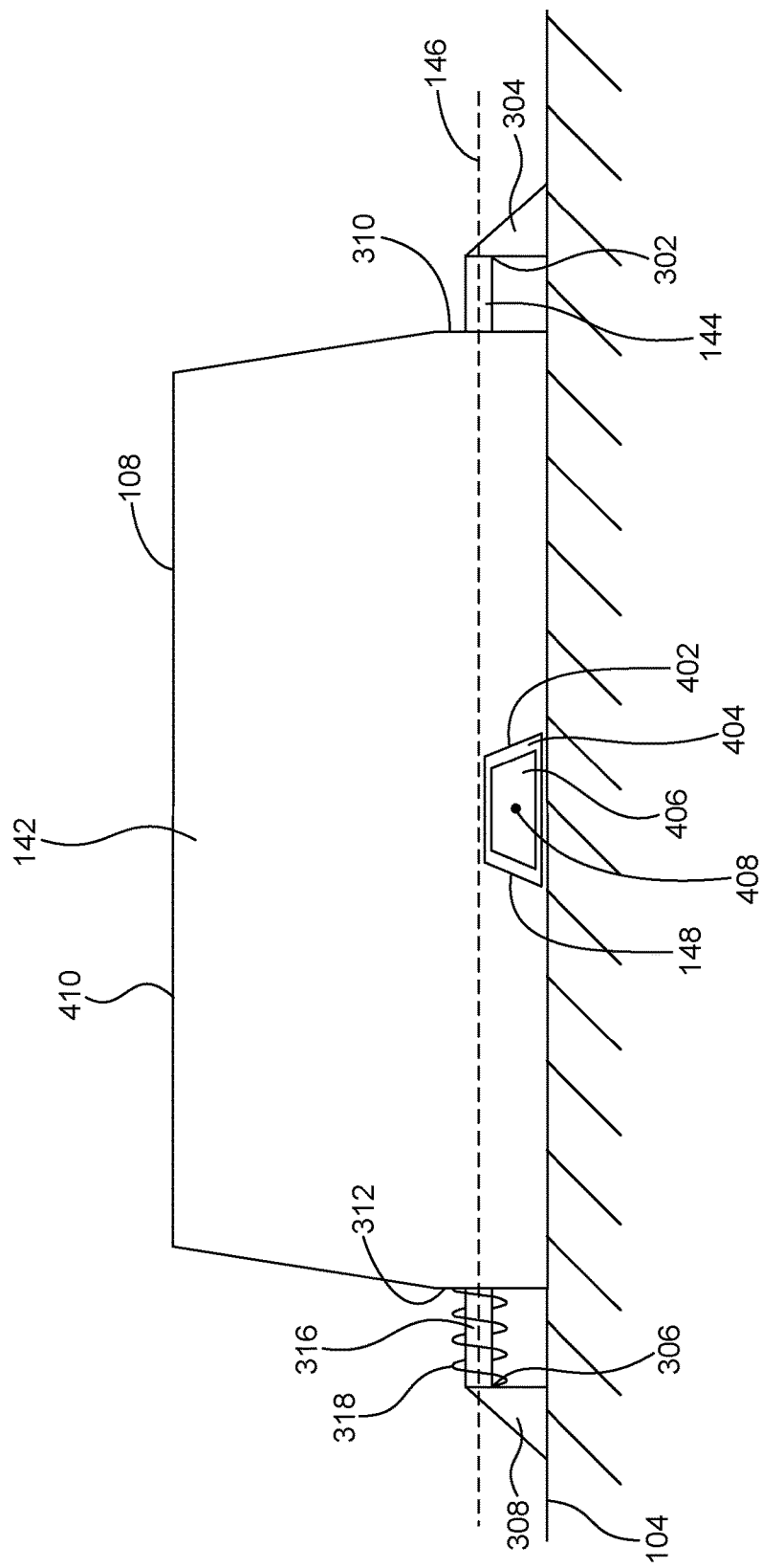
FIG. 9 is a side view of the first example fence of FIGS. 1-8 looking outboard from the example inboard portion of the first example wing, with the first fence in the example deployed position of FIGS. 2, 7 and 8.
Figure 10:
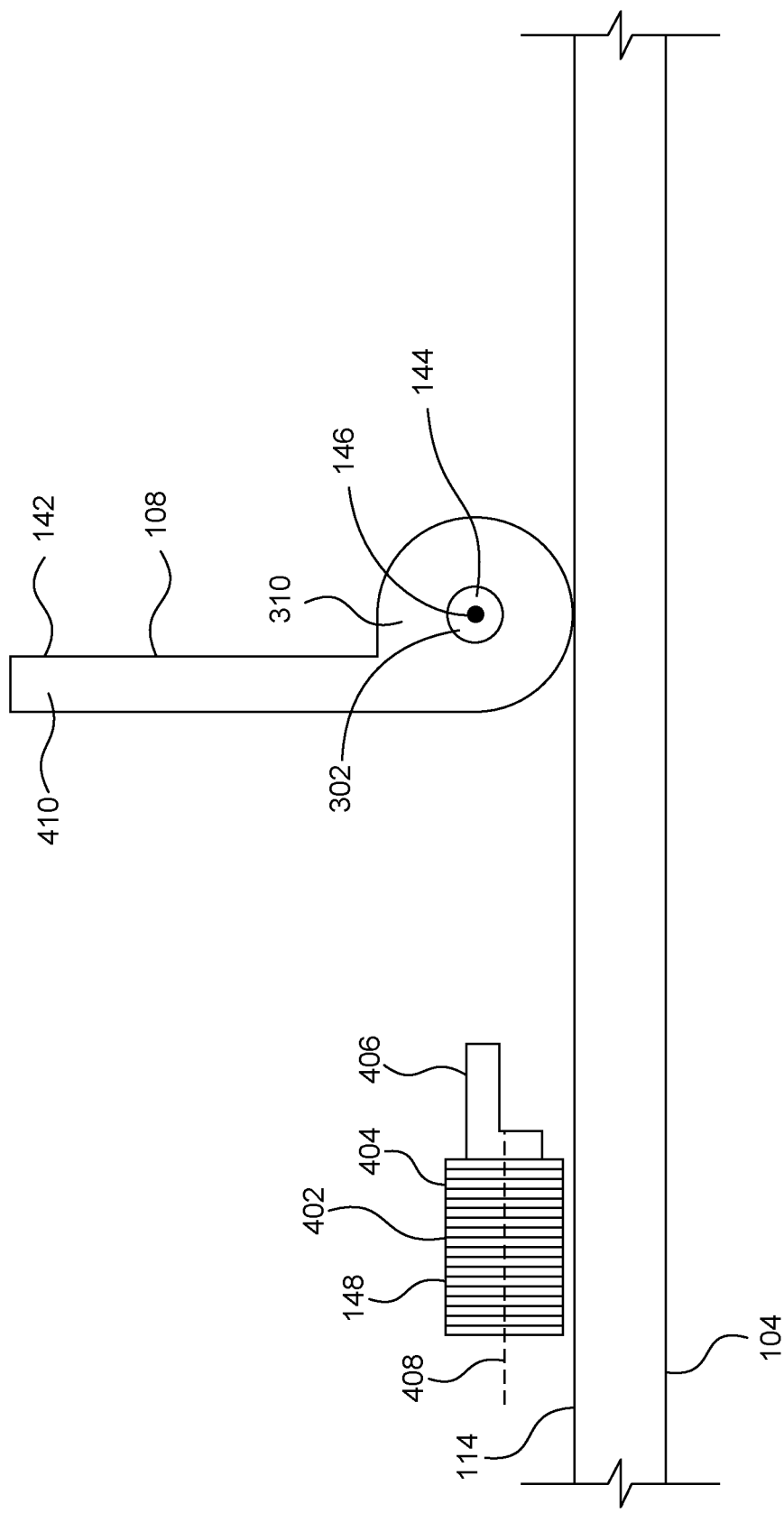
FIG. 10 is a frontal view of the first example fence of FIGS. 1-9 looking rearward along the example central axis of the example axle, with the first fence in the example deployed position of FIGS. 2 and 7-9.

FIGS. 3-10 provide additional views of the first example fence 108 of FIGS. 1 and 2 rotatably coupled to the first example wing 104 of FIGS. 1 and 2. More specifically, FIG. 3 is a cross-sectional view of the first example fence 108 of FIGS. 1 and 2 looking inboard and taken across the example central axis 146 of the example axle 144, with the first fence 108 in the example stowed position of FIG. 1. FIG. 4 is a plan view of the first example fence 108 of FIGS. 1-3 in the example stowed position of FIGS. 1 and 3. FIG. 5 is a side view of the first example fence 108 of FIGS. 1-4 looking outboard from the example inboard portion 120 of the first example wing 104, with the first fence 108 in the example stowed position of FIGS. 1, 3 and 4. FIG. 6 is a frontal view of the first example fence 108 of FIGS. 1-5 looking rearward along the example central axis 146 of the example axle 144, with the first fence 108 in the example stowed position of FIGS. 1 and 3-5. FIG. 7 is a cross-sectional view of the first example fence 108 of FIGS. 1-6 looking inboard and taken across the example central axis 146 of the example axle 144, with the first fence 108 in the example deployed position of FIG. 2. FIG. 8 is a plan view of the first example fence 108 of FIGS. 1-7 in the example deployed position of FIGS. 2 and 7. FIG. 9 is a side view of the first example fence 108 of FIGS. 1-8 looking outboard from the example inboard portion 120 of the first example wing 104, with the first fence 108 in the example deployed position of FIGS. 2, 7 and 8. FIG. 10 is a frontal view of the first example fence 108 of FIGS. 1-9 looking rearward along the example central axis 146 of the example axle 144, with the first fence 108 in the example deployed position of FIGS. 2 and 7-9.

In the illustrated example of FIGS. 3-10, the first fence 108 is rotatably coupled to the first wing 104 via the axle 144. The axle 144 includes a first example end 302 coupled to the first wing 104 via a first example axle mount 304, and further includes a second example end 306 located opposite the first end 302 and coupled to the first wing 104 via a second example axle mount 308. The first end 302 of the axle 144 is positioned toward the leading edge 126 of the first wing 104 and/or toward the first axle mount 304, and the second end 306 of the axle 144 is positioned toward the trailing edge 128 of the first wing 104 and/or toward the second axle mount 308.

The first fence 108 includes a first example end 310, a second example end 312 located opposite the first end 310, and an example through hole 314 extending between the first end 310 and the second end 312 of the first fence 108. The first end 310 of the first fence 108 is positioned toward the leading edge 126 of the first wing 104 and/or toward the first axle mount 304, and the second end 312 of the first fence 108 is positioned toward the trailing edge 128 of the first wing 104 and/or toward the second axle mount 308. The axle 144 passes and/or extends through the through hole 314 of the first fence 108 such that the axle 144 and the through hole 314 are parallel and/or coaxially located, and such that the first fence 108 is secured to the axle 144 via the first axle mount 304 and the second axle mount 308. The first axle mount 304 and the second axle mount 308 accordingly secure both the axle 144 and the first fence 108 to the first wing 104. The first fence 108 is rotatable about the axle 144, and is also rotatable relative to the first wing 104. For example, the first fence 108 is rotatable about the axle 144 relative to the first wing 104 between the stowed position shown in FIGS. 1 and 3-6 and the deployed position shown in FIGS. 2 and 7-10.

In the illustrated example of FIGS. 3-10, the panel 142 of the first fence 108 extends in an inboard direction (e.g., toward the longitudinal axis 112 of the aircraft 100) along the skin 114 of the first wing 104 when the first fence 108 is in the stowed position shown in FIGS. 3-6. As shown in FIGS. 3-6, the panel 142 of the first fence 108 extends along and is positioned over and/or on top of the skin 114 of the first wing 104 when the first fence 108 is in the stowed position. In other examples, the panel 142 of the first fence 108 can extend along and be recessed (e.g., fully or partially recessed) relative to the skin 114 of the first wing 104 when the first fence 108 is in the stowed position. As shown in FIGS. 7-10, the panel 142 of the first fence 108 extends at an upward angle (e.g., vertically) away from the skin 114 of the first wing 104 when the first fence 108 is in the deployed position. The panel 142 of the first fence 108 is configured to impact the airflow around the aircraft 100 when the first fence 108 is in the deployed position shown in FIGS. 7-10. For example, the panel 142 can impede a spanwise airflow occurring along the spanwise direction 118 of the first wing 104 when the first fence 108 is in the deployed position shown in FIGS. 7-10. As another example, the panel 142 can initiate and/or generate a vortex along the first wing 104 when the first fence 108 is in the deployed position shown in FIGS. 7-10.

In the illustrated example of FIGS. 3-10, the panel 142 of the first fence 108 is planar. In other examples, the panel 142 of the first fence 108 can be non-planar. For example, the panel 142 of the first fence 108 can have a non-planar (e.g., curved) aerodynamic shape. In some examples, the non-planar aerodynamic shape can be configured to match and/or mimic a non-planar (e.g., curved) aerodynamic shape of the first wing 104. In the illustrated example of FIGS. 3-10, the panel 142 of the first fence 108 has a trapezoidal shape between the first end 310 of the first fence 108 and the second end 312 of the first fence 108. In other examples, the panel 142 of the first fence 108 can have a different (e.g., non-trapezoidal) shape between the first end 310 of the first fence 108 and the second end 312 of the first fence 108. For example, the panel 142 of the first fence 108 can have any of a rectangular shape, a square shape, a triangular shape, a semicircular shape, a circular shape, or an elliptical shape, among others, between the first end 310 of the first fence 108 and the second end 312 of the first fence 108.

The first fence 108 of FIGS. 3-10 is configured to move from the stowed position shown in FIGS. 3-6 to the deployed position shown in FIGS. 7-10 via the latching actuator 148 and a biasing actuator associated with the first fence 108. In the illustrated example of FIGS. 3-10, an example spring-loaded axle 316 is formed via the axle 144 and an example spring 318 coiled around a portion of the axle 144. The spring 318 and/or, more generally, the spring-loaded axle 316 function(s) and/or operate(s) as a biasing actuator configured to move the first fence 108 from the stowed position shown in FIGS. 3-6 to the deployed position shown in FIGS. 7-10, dependent upon the position and/or state of the latching actuator 148. In the illustrated example of FIGS. 3-10, the spring 318 of the spring-loaded axle 316 is located between the second end 312 of the first fence 108 and the second axle mount 308. The spring 318 and/or, more generally, the spring-loaded axle 316 is/are operatively coupled to the first fence 108 such that the spring 318 and/or the spring-loaded axle 316 bias(es) the first fence 108 to the deployed position shown in FIGS. 7-10. For example, the spring 318 of the spring-loaded axle 316 generates a restoring force (e.g., a biasing force) having a restoring force value. In the absence of the latching actuator 148 engaging the panel 142 of the first fence 108, the restoring force generated via the spring 318 moves (e.g., rotates) the first fence 108 to, and/or maintains the first fence 108 in, the deployed position shown in FIGS. 7-10.

In the illustrated example of FIGS. 3-10, the spring 318 is in a relatively more wound state when the first fence 108 is in the stowed position shown in FIGS. 3-6 compared to when the first fence 108 is in the deployed position shown in FIGS. 7-10. Conversely, the spring 318 is in a relatively more unwound state when the first fence 108 is in the deployed position shown in FIGS. 7-10 compared to when the first fence 108 is in the stowed position shown in FIGS. 3-6. Stated differently, the spring 318 winds around the spring-loaded axle 316 as the first fence 108 moves from the deployed position shown in FIGS. 7-10 to the stowed position shown in FIGS. 3-6, and the spring 318 conversely unwinds around the spring-loaded axle 316 as the first fence 108 moves from the stowed position shown in FIGS. 3-6 to the deployed position shown in FIGS. 7-10. In the illustrated example of FIGS. 3-10, the spring 318 is implemented via one or more torsion spring(s). In other examples, the spring 318 may additionally or alternatively be implemented via one or more (e.g., individually or in combination) suitably arranged leaf spring(s), compression spring(s), and/or tension spring(s).

In the illustrated example of FIGS. 3-10, the latching actuator 148 is implemented via an example electromechanical latch 402 having an example solenoid 404 and an example armature 406 operatively coupled to the solenoid 404. The armature 406 and/or, more generally, the electromechanical latch 402 has an example central axis 408. The armature 406 is movable (e.g., slidable and/or translatable) along the central axis 408 via operation of the solenoid 404. For example, the solenoid 404 can cause the armature 406 to move (e.g., retract) along the central axis 408 from a first position (e.g., an engaged position) to a second position (e.g., a disengaged position) in response to a control signal (e.g., an electronic control signal) received at the solenoid 404. In the illustrated example of FIGS. 3-10, the solenoid 404, the armature 406 and/or, more generally, the electromechanical latch 402 has/have a trapezoidal cross-sectional shape configured to reduce drag along the first wing 104. In other examples, the solenoid 404, the armature 406 and/or the electromechanical latch 402 can have a shape and/or shapes that differ from that/those shown in FIGS. 3-10.

In the illustrated example of FIGS. 3-10, the solenoid 404 and/or, more generally, the electromechanical latch 402 causes the armature 406 to engage an example lip 410 of the panel 142 of the first fence 108 when the armature 406 and/or, more generally, the electromechanical latch 402 is in the first position. The engagement between the armature 406 of the electromechanical latch 402 and the lip 410 of the panel 142 maintains the panel 142 and/or, more generally, the first fence 108 in the stowed position shown in FIGS. 3-6. In response to a control signal (e.g., an electronic control signal) received at the solenoid 404, the solenoid 404 and/or, more generally, the electromechanical latch 402 causes the armature 406 to move (e.g., retract) along the central axis 408 from the first position (e.g., an engaged position) to a second position (e.g., a disengaged position). The armature 406 disengages and/or releases from the lip 410 of the panel 142 of the first fence 108 when the armature 406 and/or, more generally, the electromechanical latch 402 is in the second position. The disengagement and/or release of the armature 406 of the electromechanical latch 402 from the lip 410 of the panel 142 enables the biasing actuator (e.g., the spring-loaded axle 316 of FIGS. 3-10 described above) to move the panel 142 and/or, more generally, the first fence 108 from the stowed position shown in FIGS. 3-6 to the deployed position shown in FIGS. 7-10. Thus, the biasing actuator is configured to move the first fence 108 from the stowed position shown in FIGS. 3-6 to the deployed position shown in FIGS. 7-10 in response to the armature 406 of the electromechanical latch 402 being moved (e.g., retracted) from the first position (e.g., an engaged position) to the second position (e.g., a disengaged position).

In some examples, the armature 406 of the electromechanical latch 402 is configured to be maintained in the first position (e.g., an engaged position) shown in FIGS. 3-6 during a cruise operation of the aircraft 100 having a first speed, and the armature 406 of the electromechanical latch 402 is further configured to move (e.g., to retract) from the first position (e.g., an engaged position) shown in FIGS. 3-6 to the second position (e.g., a disengaged position) shown in FIGS. 7-10 during a reduced speed operation (e.g., a takeoff or landing operation) of the aircraft 100 having a second speed less than the first speed.

While FIGS. 3-10 and the descriptions thereof provided above are directed to the latching actuator 148 being implemented as an electromechanical latch (e.g., electromechanical latch 402) configured to change positions and/or states in response to receipt of a control signal (e.g., an electronic control signal), the latching actuator 148 can be implemented in other forms including, for example, electrical, hydraulic, pneumatic, motor-driven, and/or shape memory alloy actuators. For example, the latching actuator 148 can alternatively be implemented as a hydraulic latch configured to change positions and/or states in response to receipt of a pressurized hydraulic fluid. As another example, the latching actuator 148 can alternatively be implemented as a pneumatic latch configured to change positions and/or states in response to receipt of pressurized air. As yet another example, the latching actuator 148 can alternatively be implemented as a shape memory alloy configured to change positions, shapes and/or states in response to an application of heat.

Furthermore, while FIGS. 3-10 and the descriptions thereof provided above are directed to the biasing actuator of the first fence 108 being implemented as a spring-loaded axle (e.g., spring-loaded axle 316) configured to bias and/or move the first fence 108 from the stowed position shown in FIGS. 3-6 to the deployed position shown in FIGS. 7-10, the biasing actuator of the first fence 108 can be implemented in other forms including, for example, electrical, hydraulic, pneumatic, motor-driven, and/or shape memory alloy actuators. Moreover, while FIGS. 3-10 and the descriptions thereof provided above are directed to the first fence 108 of FIGS. 1 and 2 that is rotatably coupled to the first wing 104 of FIGS. 1 and 2, the informed reader will recognize that the second fence 110 of FIGS. 1 and 2 that is rotatably coupled to the second wing 106 of FIGS. 1 and 2 can be similarly implemented (e.g., in a manner that is mirrored about the longitudinal axis 112 of the aircraft 100). Moreover, while FIGS. 3-10 and the descriptions thereof provided above are directed to the first fence 108 of FIGS. 1 and 2 that is rotatably coupled to the first wing 104 of FIGS. 1 and 2, the informed reader will recognize that any number of additional fences can be similarly implemented on the first wing 104.

Figure 11:
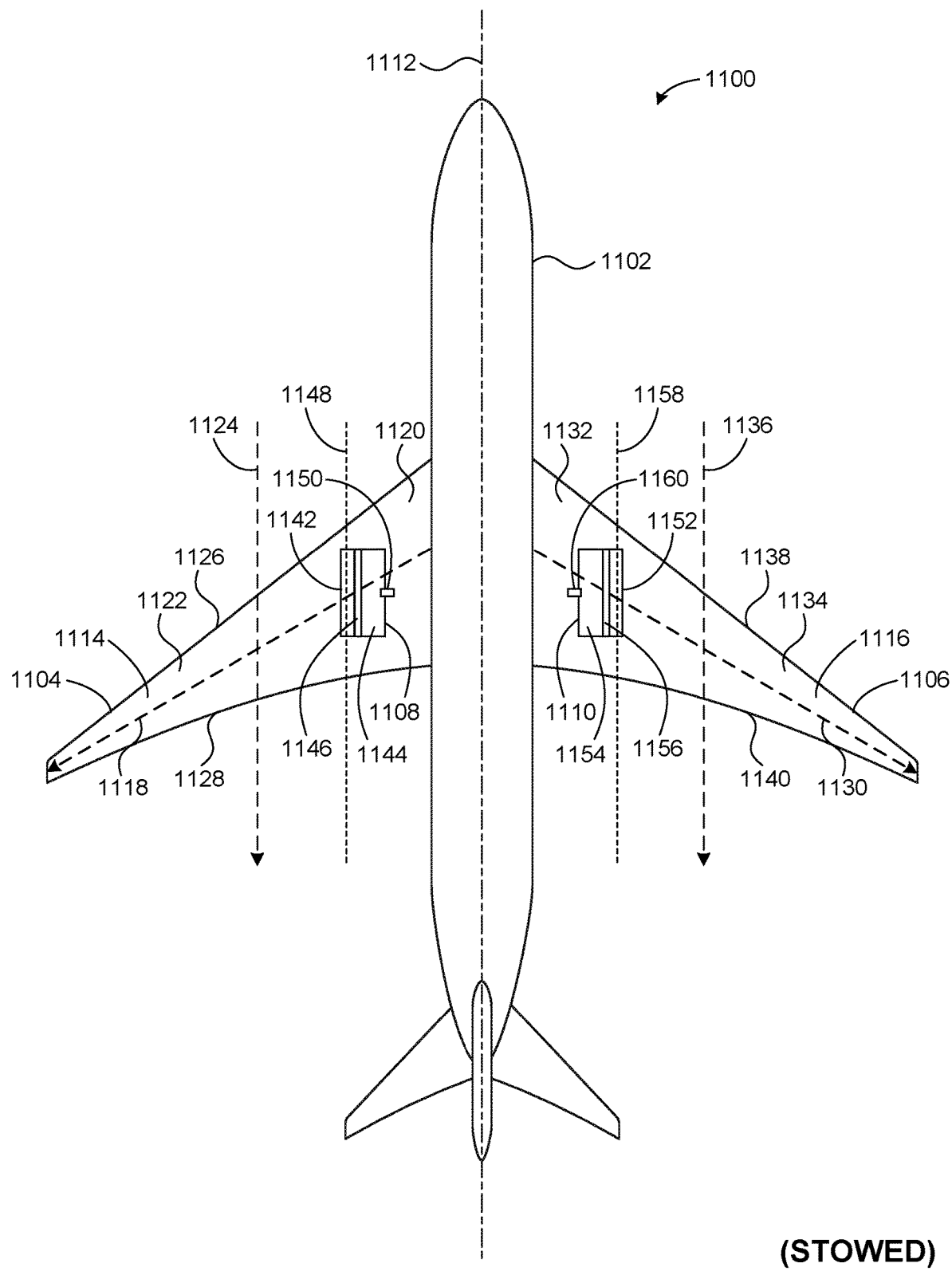
FIG. 11 illustrates another example aircraft in which example automated deployable fences can be implemented in accordance with teachings of this disclosure.
Figure 12:
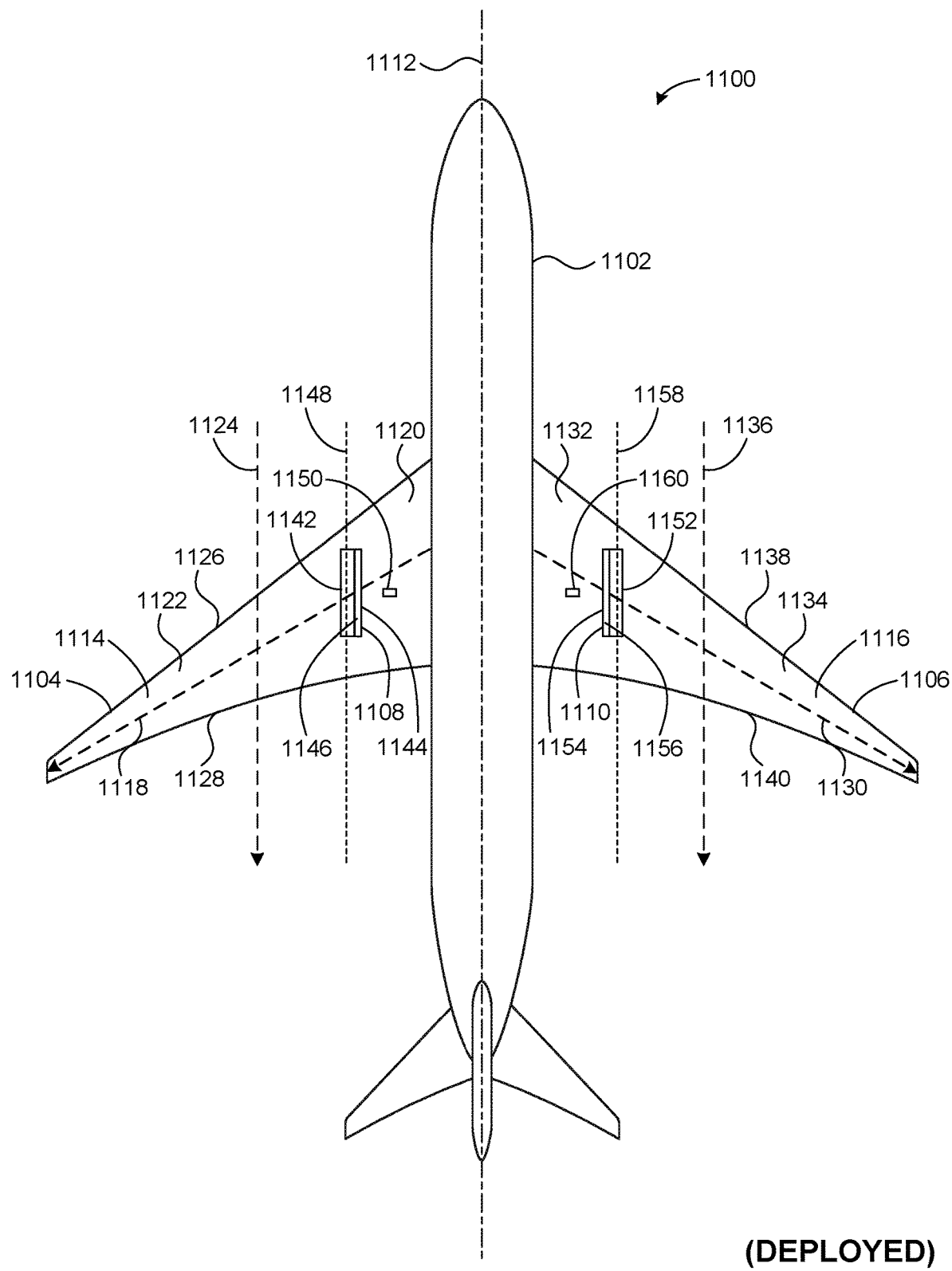
FIG. 12 illustrates the example aircraft of FIG. 11 with the example automated deployable fences of FIG. 11 deployed.

In some examples, two or more of the above-described components (e.g., the first fence 108, the axle 144, the first axle mount 304, the second axle mount 308, and/or the spring 318 of FIGS. 1-10, etc.) may be manufactured or fabricated as a single piece, formed of an elastic material such as a carbon fiber composite or a 3D-printed plastic, and structured or configured to create an elastic restoring force. For example, FIG. 11 illustrates another example aircraft 1100 in which example automated deployable fences can be implemented in accordance with teachings of this disclosure. FIG. 11 illustrates the example aircraft 1100 of FIG. 11 with the example automated deployable fences of FIG. 11 stowed. FIG. 12 illustrates the example aircraft 1100 of FIG. 11 with the example automated deployable fences of FIG. 11 deployed. The aircraft 1100 can be any form and/or type of aircraft including, for example, a civil (e.g., business or commercial) aircraft, a military aircraft, a manned (e.g., piloted) aircraft, an unmanned aircraft (e.g., a drone), etc. In the illustrated example of FIGS. 11 and 12, the aircraft 1100 includes an example fuselage 1102, a first example wing 1104 (e.g., a left-side wing), a second example wing 1106 (e.g., a right-side wing), a first example fence 1108 (e.g., a left-side fence), and a second example fence 1110 (e.g., a right-side fence). Although the illustrated example of FIGS. 11 and 12 depicts only a single fence located on each wing of the aircraft 1100 (e.g., the first fence 1108 located on the first wing 1104, and the second fence 1110 located on the second wing 1106), other example implementations can include multiple (e.g., 2, 3, 4, etc.) fences located on each wing of the aircraft 1100. In some examples, the location(s), size(s), and/or shape(s) of respective ones of the fences (e.g., the first fence 1108 and the second fence 1110) of the aircraft 1100 can differ relative to the location(s), size(s) and/or shape(s) of the fences shown in FIGS. 11 and 12.

The fuselage 1102 of FIGS. 11 and 12 has a generally cylindrical shape that defines an example longitudinal axis 1112 of the aircraft 1100. The first wing 1104 and the second wing 1106 of FIGS. 11 and 12 are respectively coupled to the fuselage 1102 and swept in a rearward direction of the aircraft 1100. The first wing 1104 includes an example skin 1114 forming (e.g., forming all or part of) an outer surface of the first wing 1104, and the second wing 1106 includes an example skin 1116 forming (e.g., forming all or part of) an outer surface of the second wing 1106.

The first wing 1104 of FIGS. 11 and 12 defines an example spanwise direction 1118 moving from an example inboard portion 1120 (e.g., inboard relative to the spanwise location of the first fence 1108) of the first wing 1104 toward an example outboard portion 1122 (e.g., outboard relative to the spanwise location of the first fence 1108) of the first wing 1104. The spanwise direction 1118 defined by the first wing 1104 is representative of a direction of a spanwise airflow that may occur along the first wing 1104. The first wing 1104 also defines an example chordwise direction 1124 moving from an example leading edge 1126 of the first wing 1104 toward an example trailing edge 1128 of the first wing 1104. The chordwise direction 1124 defined by the first wing 1104 is representative of a direction of a chordwise airflow (e.g., a cruise airflow) that may occur along the first wing 1104.

The second wing 1106 of FIGS. 11 and 12 defines an example spanwise direction 1130 moving from an example inboard portion 1132 (e.g., inboard relative to the spanwise location of the second fence 1110) of the second wing 1106 toward an example outboard portion 1134 (e.g., outboard relative to the spanwise location of the second fence 1110) of the second wing 1106. The spanwise direction 1130 defined by the second wing 1106 is representative of a direction of a spanwise airflow that may occur along the second wing 1106. The second wing 1106 also defines an example chordwise direction 1136 moving from an example leading edge 1138 of the second wing 1106 toward an example trailing edge 1140 of the second wing 1106. The chordwise direction 1136 defined by the second wing 1106 is representative of a direction of a chordwise airflow (e.g., a cruise airflow) that may occur along the second wing 1106.

The first fence 1108 of FIGS. 11 and 12 includes an example base 1142, an example panel 1144, and an example living hinge 1146 extending between the base 1142 and the panel 1144. The base 1142 of the first fence 1108 is coupled (e.g., fixedly or non-movably coupled) to the first wing 1104 of the aircraft 1100. The base 1142 has an example central axis 1148. In the illustrated example of FIGS. 11 and 12, the central axis 1148 of the base 1142 is parallel to the chordwise direction 1124 of the first wing 1104. In other examples, the central axis 1148 of the base 1142 can be canted (e.g., at a toe-in angle or a toe-out angle) relative to the chordwise direction 1124 of the first wing 1104. For example, the central axis 1148 of the base 1142 can be canted at a toe-in angle relative to the chordwise direction 1124 of the first wing 1104 such that a first end of the base 1142 positioned toward the leading edge 1126 of the first wing 1104 is located closer to the longitudinal axis 1112 of the aircraft 1100 than is a second end of the base 1142 positioned toward the trailing edge 1128 of the first wing 1104. As another example, the central axis 1148 of the base 1142 can be canted at a toe-out angle relative to the chordwise direction 1124 of the first wing 1104 such that a first end of the base 1142 positioned toward the leading edge 1126 of the first wing 1104 is located further away from the longitudinal axis 1112 of the aircraft 1100 than is a second end of the base 1142 positioned toward the trailing edge 1128 of the first wing 1104.

The panel 1144 of the first fence 1108 is coupled to the base 1142 of the first fence 1108 via the living hinge 1146 of the first fence 1108 such that the panel 1144 is movable (e.g., rotatable) relative to the base 1142 and/or relative to the first wing 1104 between the stowed position shown in FIG. 11 and the deployed position shown in FIG. 12. The panel 1144 of the first fence 1108 extends (e.g., in an inboard direction toward the longitudinal axis 1112) along the skin 1114 of the first wing 1104 when the first fence 1108 is in the stowed position shown in FIG. 11. In some examples, the panel 1144 of the first fence 1108 extends along and is positioned over and/or on top of the skin 1114 of the first wing 1104 when the first fence 1108 is in the stowed position shown in FIG. 11. In other examples, the panel 1144 of the first fence 1108 extends along and is recessed (e.g., fully or partially recessed) relative to the skin 1114 of the first wing 1104 when the first fence 1108 is in the stowed position shown in FIG. 11.

The panel 1144 of the first fence 1108 extends at an upward angle (e.g., vertically) away from the skin 1114 of the first wing 1104 when the first fence 1108 is in the deployed position shown in FIG. 12. The panel 1144 of the first fence 1108 is configured to impact the airflow around the aircraft 1100 when the first fence 1108 is in the deployed position shown in FIG. 12. For example, the panel 1144 can impede a spanwise airflow occurring along the spanwise direction 1118 of the first wing 1104 when the first fence 1108 is in the deployed position shown in FIG. 12. As another example, the panel 1144 can initiate and/or generate a vortex along the first wing 1104 when the first fence 1108 is in the deployed position shown in FIG. 12.

The living hinge 1146 of the first fence 1108 extends between the base 1142 of the first fence 1108 and the panel 1144 of the first fence 1108. In some examples, the living hinge 1146 has a thickness that is less than a thickness of the base 1142, and/or less than a thickness of the panel 1144. The living hinge 1146 of the first fence 1108 is flexible, and enables and/or causes the panel 1144 of the first fence 1108 of FIGS. 11 and 12 to move between the stowed position shown in FIG. 11 and the deployed position shown in FIG. 12.

The panel 1144 of the first fence 108 of FIGS. 11 and 12 is configured to move from the stowed position shown in FIG. 11 to the deployed position shown in FIG. 12 via a latching actuator associated with the first fence 1108 and via the living hinge 1146 of the first fence 1108. In the illustrated example of FIGS. 11 and 12, an example latching actuator 1150 is movable between a first position (e.g., an engaged position) in which the latching actuator 1150 maintains the panel 1144 of the first fence 1108 in the stowed position shown in FIG. 11, and a second position (e.g., a disengaged position) in which the latching actuator 1150 releases the panel 1144 of the first fence 1108 from the stowed position shown in FIG. 11. The living hinge 1146 of the first fence 1108 biases the panel 1144 of the first fence 1108 to move from the stowed position shown in FIG. 11 to the deployed position shown in FIG. 12. The living hinge 1146 is configured to move the panel 1144 of the first fence 1108 from the stowed position shown in FIG. 11 to the deployed position shown in FIG. 12 in response to the latching actuator 1150 being moved from the first position (e.g., engaged position) to the second position (e.g., disengaged position). Example means for implementing the latching actuator 1150 and the living hinge 1146 associated with the first fence 1108 are described below in connection with FIGS. 13-20.

In the illustrated example of FIGS. 11 and 12, the latching actuator 1150 associated with the first fence 1108 is configured to move from the first position (e.g., engaged position) to the second position (e.g., disengaged position) in response to a control signal received at the latching actuator 1150 from a controller of a flight control system of the aircraft 1100. The flight control system includes one or more sensor(s) configured to detect one or more operational characteristic(s) of the aircraft 1100 including, for example, an airspeed, an angle of attack, and/or an airflow angle. In some examples, the controller is configured to transmit the control signal to the latching actuator 1150 of FIGS. 11 and 12 in response to the controller determining that one or more of the operational characteristic(s) violate(s) and/or fail(s) to satisfy one or more corresponding threshold(s). In some examples, the flight control system includes a user interface configured to present data corresponding to the operational characteristic(s) detected by the sensor(s). In some examples, the controller is configured to transmit the control signal to the latching actuator 1150 of FIGS. 11 and 12 in response to the controller receiving an actuation command from the user interface of the flight control system. Example means for implementing the flight control system of the aircraft 1100 are described below in connection with FIG. 26.

In some examples, the latching actuator 1150 associated with the first fence 1108 is configured to be maintained in the first position (e.g., engaged position) shown in FIG. 11 during a cruise operation of the aircraft 1100 having a first speed, and the latching actuator 1150 is further configured to move from the first position (e.g., engaged position) shown in FIG. 11 to the second position (e.g., disengaged position) shown in FIG. 12 during a reduced speed operation (e.g., a takeoff or landing operation) of the aircraft 100 having a second speed less than the first speed.

The second fence 1110 of FIGS. 11 and 12 includes an example base 1152, an example panel 1154, and an example living hinge 1156 extending between the base 1152 and the panel 1154. The base 1152 of the second fence 1110 is coupled (e.g., fixedly or non-movably coupled) to the second wing 1106 of the aircraft 1100. The base 1152 has an example central axis 1158. In the illustrated example of FIGS. 11 and 12, the central axis 1158 of the base 1152 is parallel to the chordwise direction 1136 of the second wing 1106. In other examples, the central axis 1158 of the base 1152 can be canted (e.g., at a toe-in angle or a toe-out angle) relative to the chordwise direction 1136 of the second wing 1106. For example, the central axis 1158 of the base 1152 can be canted at a toe-in angle relative to the chordwise direction 1136 of the second wing 1106 such that a first end of the base 1152 positioned toward the leading edge 1138 of the second wing 1106 is located closer to the longitudinal axis 1112 of the aircraft 1100 than is a second end of the base 1152 positioned toward the trailing edge 1140 of the second wing 1106. As another example, the central axis 1158 of the base 1152 can be canted at a toe-out angle relative to the chordwise direction 1136 of the second wing 1106 such that a first end of the base 1152 positioned toward the leading edge 1138 of the second wing 1106 is located further away from the longitudinal axis 1112 of the aircraft 1100 than is a second end of the base 1152 positioned toward the trailing edge 1140 of the second wing 1106.

The panel 1154 of the second fence 1110 is coupled to the base 1152 of the second fence 1110 via the living hinge 1156 of the second fence 1110 such that the panel 1154 is movable (e.g., rotatable) relative to the base 1152 and/or relative to the second wing 1106 between the stowed position shown in FIG. 11 and the deployed position shown in FIG. 12. The panel 1154 of the second fence 1110 extends (e.g., in an inboard direction toward the longitudinal axis 1112) along the skin 1116 of the second wing 1106 when the second fence 1110 is in the stowed position shown in FIG. 11. In some examples, the panel 1154 of the second fence 1110 extends along and is positioned over and/or on top of the skin 1116 of the second wing 1106 when the second fence 1110 is in the stowed position shown in FIG. 11. In other examples, the panel 1154 of the second fence 1110 extends along and is recessed (e.g., fully or partially recessed) relative to the skin 1116 of the second wing 1106 when the second fence 1110 is in the stowed position shown in FIG. 11.

The panel 1154 of the second fence 1110 extends at an upward angle (e.g., vertically) away from the skin 1116 of the second wing 1106 when the second fence 1110 is in the deployed position shown in FIG. 12. The panel 1154 of the second fence 1110 is configured to impact the airflow around the aircraft 1100 when the second fence 1110 is in the deployed position shown in FIG. 12. For example, the panel 1154 can impede a spanwise airflow occurring along the spanwise direction 1130 of the second wing 1106 when the second fence 1110 is in the deployed position shown in FIG. 12. As another example, the panel 1154 can initiate and/or generate a vortex along the second wing 1106 when the second fence 1110 is in the deployed position shown in FIG. 12.

The living hinge 1156 of the second fence 1110 extends between the base 1152 of the second fence 1110 and the panel 1154 of the second fence 1110. In some examples, the living hinge 1156 has a thickness that is less than a thickness of the base 1152, and/or less than a thickness of the panel 1154. The living hinge 1156 of the second fence 1110 is flexible, and enables and/or causes the panel 1154 of the second fence 1110 of FIGS. 11 and 12 to move between the stowed position shown in FIG. 11 and the deployed position shown in FIG. 12.

The panel 1154 of the second fence 1110 of FIGS. 11 and 12 is configured to move from the stowed position shown in FIG. 11 to the deployed position shown in FIG. 12 via a latching actuator associated with the second fence 1110 and via the living hinge 1156 of the second fence 1110. In the illustrated example of FIGS. 11 and 12, an example latching actuator 1160 is movable between a first position (e.g., an engaged position) in which the latching actuator 1160 maintains the panel 1154 of the second fence 1110 in the stowed position shown in FIG. 11, and a second position (e.g., a disengaged position) in which the latching actuator 1160 releases the panel 1154 of the second fence 1110 from the stowed position shown in FIG. 11. The living hinge 1156 of the second fence 1110 biases the panel 1154 of the second fence 1110 to move from the stowed position shown in FIG. 11 to the deployed position shown in FIG. 12. The living hinge 1156 is configured to move the panel 1154 of the second fence 1110 from the stowed position shown in FIG. 11 to the deployed position shown in FIG. 12 in response to the latching actuator 1160 being moved from the first position (e.g., engaged position) to the second position (e.g., disengaged position). Example means for implementing the latching actuator 1160 and the living hinge 1156 associated with the second fence 1110 are described below in connection with FIGS. 13-20.

In the illustrated example of FIGS. 11 and 12, the latching actuator 1160 associated with the second fence 1110 is configured to move from the first position (e.g., engaged position) to the second position (e.g., disengaged position) in response to a control signal received at the latching actuator 1160 from a controller of a flight control system of the aircraft 1100. The flight control system includes one or more sensor(s) configured to detect one or more operational characteristic(s) of the aircraft 1100 including, for example, an airspeed, an angle of attack, and/or an airflow angle. In some examples, the controller is configured to transmit the control signal to the latching actuator 1160 of FIGS. 11 and 12 in response to the controller determining that one or more of the operational characteristic(s) violate(s) and/or fail(s) to satisfy one or more corresponding threshold(s). In some examples, the flight control system includes a user interface configured to present data corresponding to the operational characteristic(s) detected by the sensor(s). In some examples, the controller is configured to transmit the control signal to the latching actuator 1160 of FIGS. 11 and 12 in response to the controller receiving an actuation command from a user interface of the flight control system. Example means for implementing the flight control system of the aircraft 1100 are described below in connection with FIG. 26.

In some examples, the latching actuator 1160 associated with the second fence 1110 is configured to be maintained in the first position (e.g., engaged position) shown in FIG. 11 during a cruise operation of the aircraft 1100 having a first speed, and the latching actuator 1160 is further configured to move from the first position (e.g., engaged position) shown in FIG. 11 to the second position (e.g., disengaged position) shown in FIG. 12 during a reduced speed operation (e.g., a takeoff or landing operation) of the aircraft 100 having a second speed less than the first speed.

Figure 13:
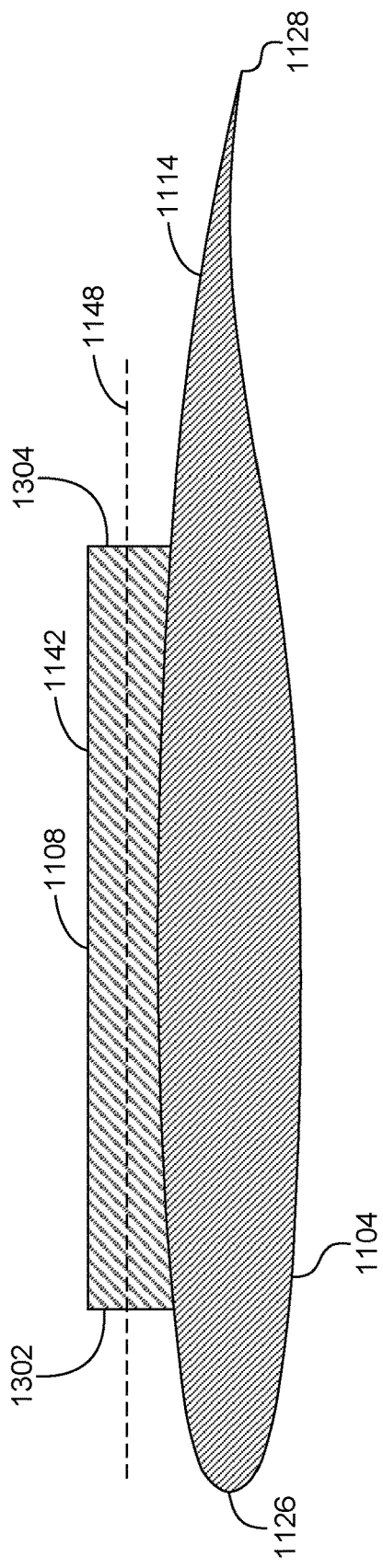
FIG. 13 is a cross-sectional view of the first example fence of FIGS. 11 and 12 looking inboard and taken across the example central axis of the example base, with the first fence in the example stowed position of FIG. 11.
Figure 14:
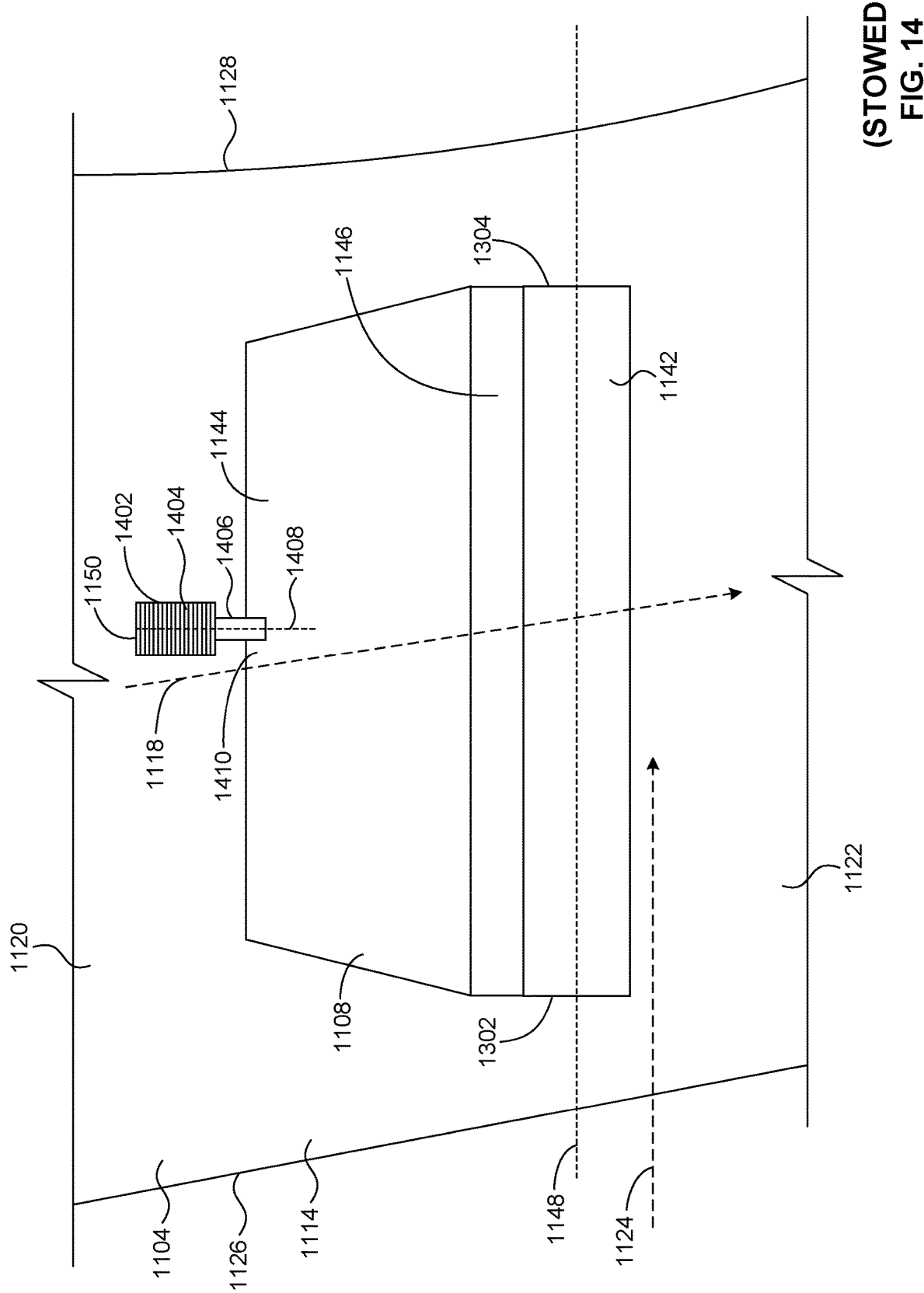
FIG. 14 is a plan view of the first example fence of FIGS. 11-13 in the example stowed position of FIGS. 11 and 13.
Figure 15:
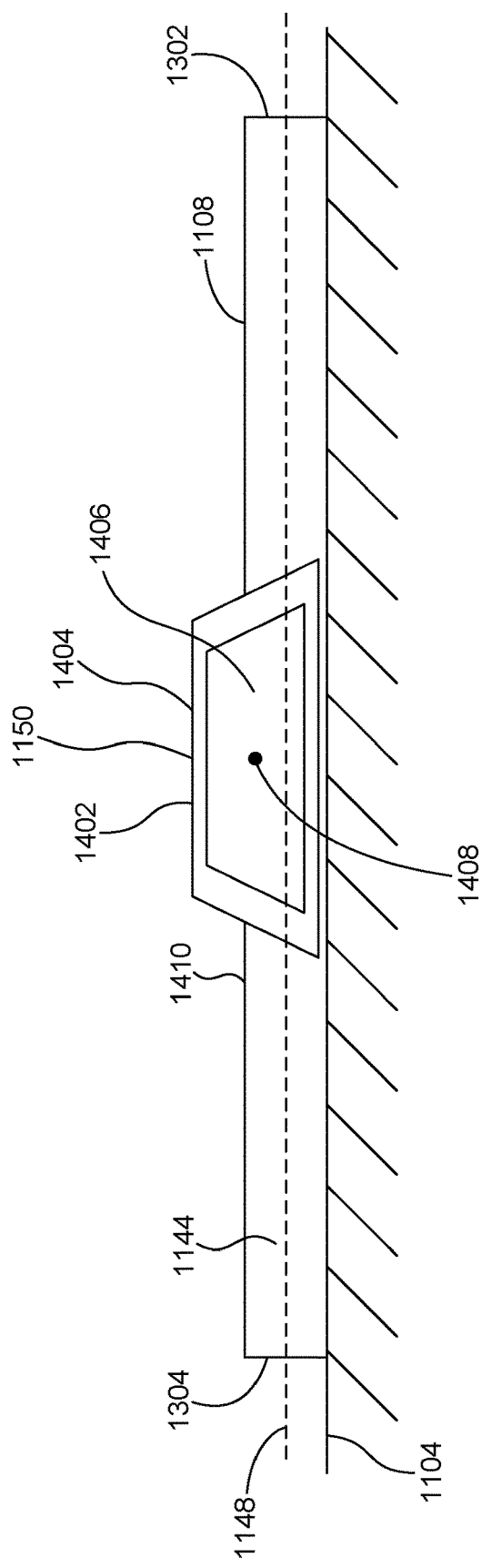
FIG. 15 is a side view of the first example fence of FIGS. 11-14 looking outboard from the example inboard portion of the first example wing, with the first fence in the example stowed position of FIGS. 11, 13 and 14.
Figure 16:
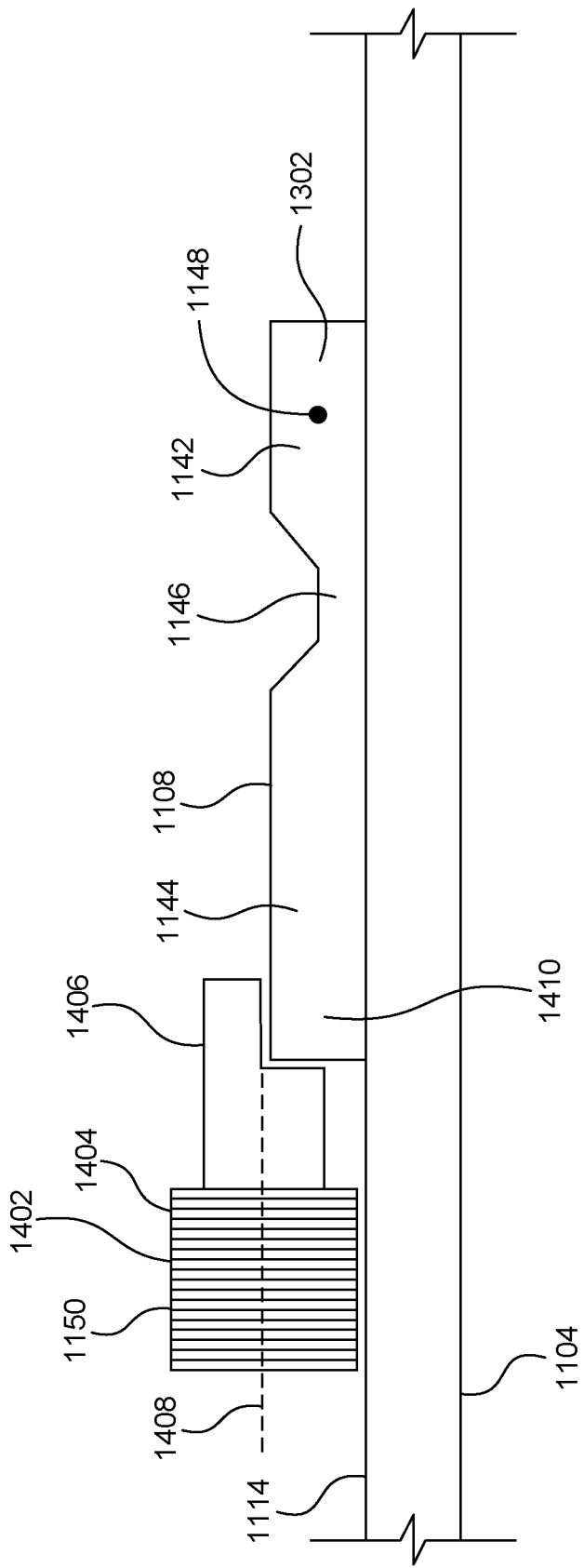
FIG. 16 is a frontal view of the first example fence of FIGS. 11-15 looking rearward along the example central axis of the example base, with the first fence in the example stowed position of FIGS. 11 and 13-15.
Figure 17:
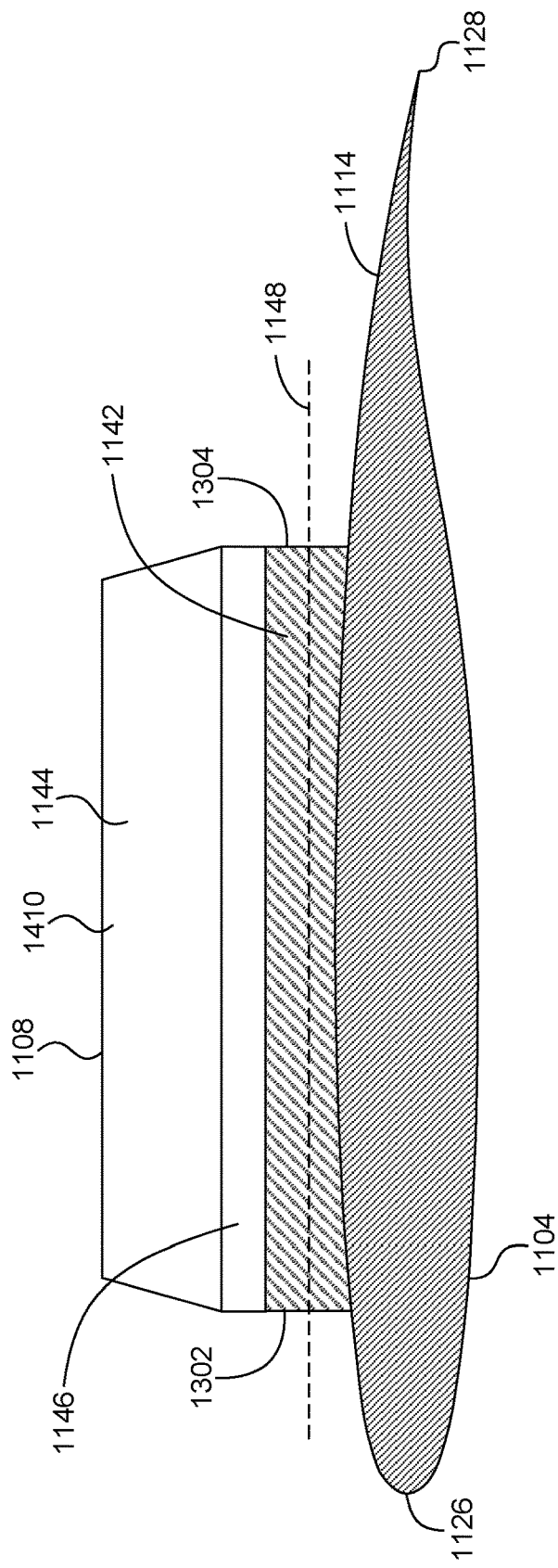
FIG. 17 is a cross-sectional view of the first example fence of FIGS. 11-16 looking inboard and taken across the example central axis of the example base, with the first fence in the example deployed position of FIG. 12.
Figure 18:
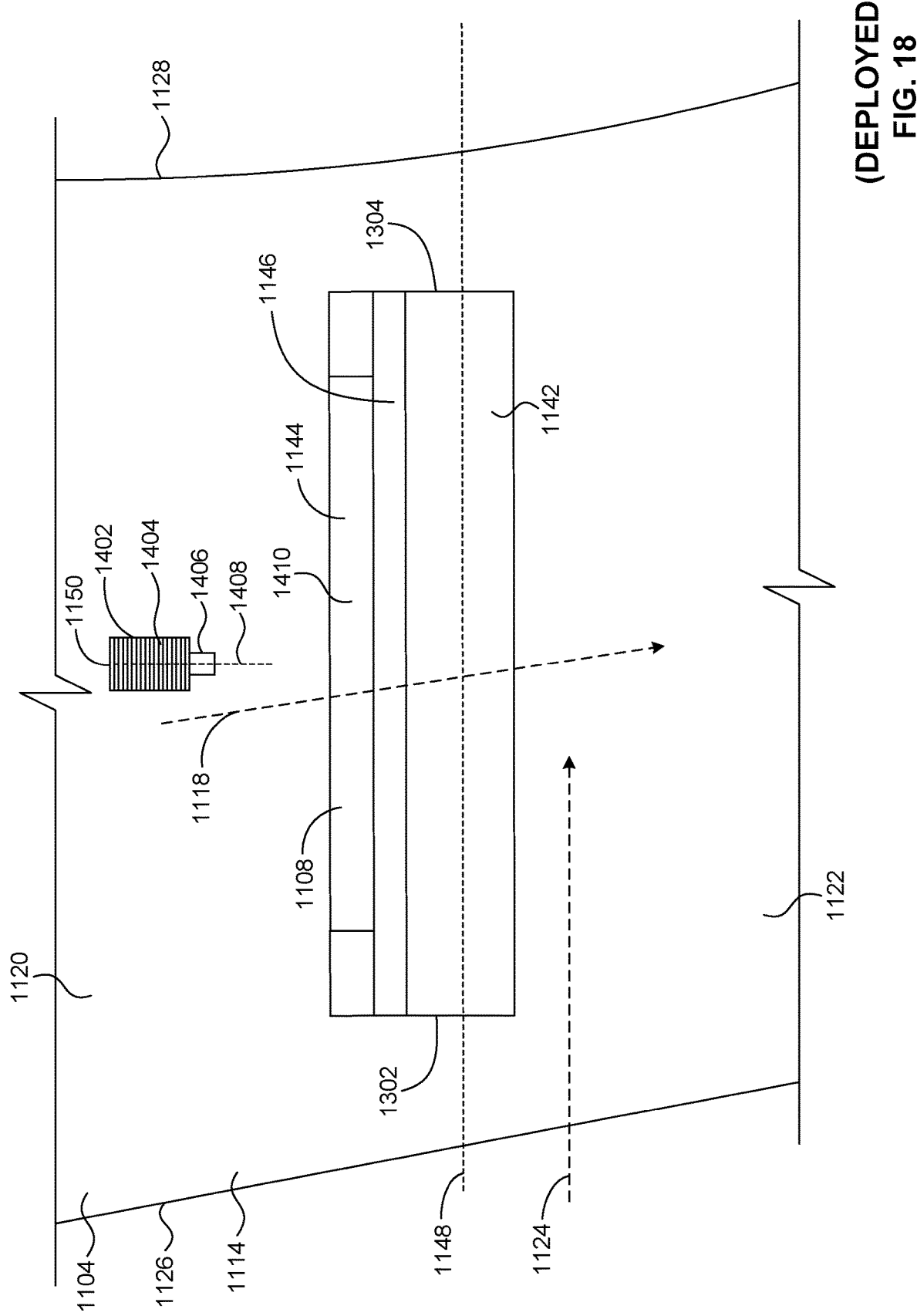
FIG. 18 is a plan view of the first example fence of FIGS. 11-17 in the example deployed position of FIGS. 12 and 17.
Figure 19:
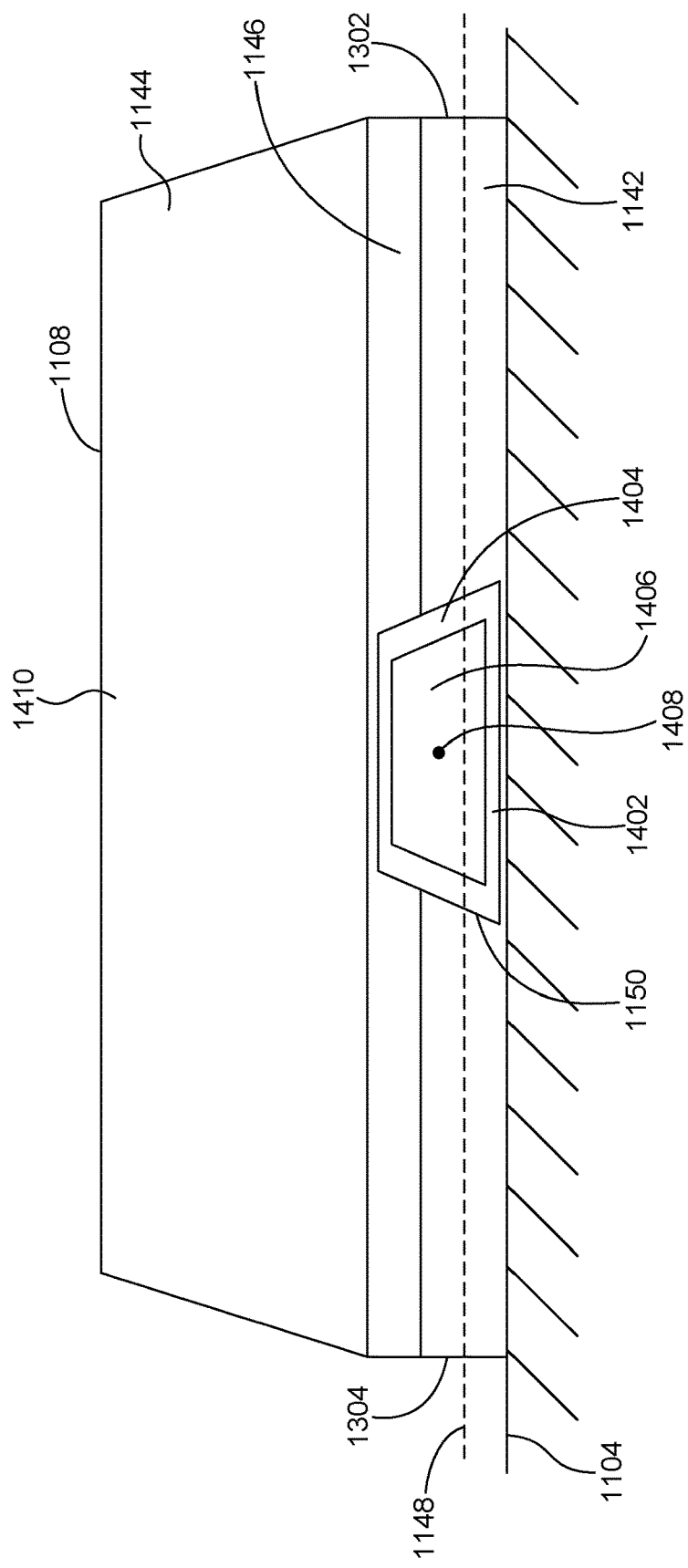
FIG. 19 is a side view of the first example fence of FIGS. 11-18 looking outboard from the example inboard portion of the first example wing, with the first fence in the example deployed position of FIGS. 12, 17 and 18.

FIGS. 13-20 provide additional views of the first example fence 1108 of FIGS. 11 and 12 coupled to the first example wing 1104 of FIGS. 11 and 12. More specifically, FIG. 13 is a cross-sectional view of the first example fence 1108 of FIGS. 11 and 12 looking inboard and taken across the example central axis 1148 of the example base 1142, with the first fence 1108 in the example stowed position of FIG. 11. FIG. 14 is a plan view of the first example fence 1108 of FIGS. 11-13 in the example stowed position of FIGS. 11 and 13. FIG. 15 is a side view of the first example fence 1108 of FIGS. 1-4 looking outboard from the example inboard portion 1120 of the first example wing 1104, with the first fence 1108 in the example stowed position of FIGS. 11, 13 and 14. FIG. 16 is a frontal view of the first example fence 1108 of FIGS. 11-15 looking rearward along the example central axis 1148 of the example base 1142, with the first fence 1108 in the example stowed position of FIGS. 11 and 13-15. FIG. 17 is a cross-sectional view of the first example fence 1108 of FIGS. 11-16 looking inboard and taken across the example central axis 1148 of the example base 1142, with the first fence 1108 in the example deployed position of FIG. 12. FIG. 18 is a plan view of the first example fence 1108 of FIGS. 11-17 in the example deployed position of FIGS. 12 and 17. FIG. 19 is a side view of the first example fence 1108 of FIGS. 11-18 looking outboard from the example inboard portion 1120 of the first example wing 1104, with the first fence 1108 in the example deployed position of FIGS. 12, 17 and 18. FIG. 10 is a frontal view of the first example fence 1108 of FIGS. 11-19 looking rearward along the example central axis 1148 of the example base 1142, with the first fence 1108 in the example deployed position of FIGS. 12 and 17-19.

In the illustrated example of FIGS. 13-20, the base 1142 of the first fence 1108 is coupled (e.g., fixedly or non-movably coupled) to the first wing 1104 of the aircraft 1100. For example, the base 1142 of the first fence 1108 can be coupled to the first wing 1104 via one or more fastener(s) that can include one or more mechanical fastener(s) (e.g., rivet(s), screw(s), bolt(s), pin(s), etc.) and/or one or more chemical fastener(s) (e.g., glue(s), epox(ies), bonding agent(s), etc.), and/or any combination thereof. The base 1142 of the first fence 1108 includes a first example end 1302, and further includes a second example end 1304 located opposite the first end 1302. The first end 1302 of the base 1142 is positioned toward the leading edge 1126 of the first wing 1104, and the second end 1304 of the base 1142 is positioned toward the trailing edge 1128 of the first wing 1104.

In the illustrated example of FIGS. 13-20, the panel 1144 of the first fence 1108 extends in an inboard direction (e.g., toward the longitudinal axis 1112 of the aircraft 1100) along the skin 1114 of the first wing 1104 when the first fence 1108 is in the stowed position shown in FIGS. 13-16. As shown in FIGS. 13-16, the panel 1144 of the first fence 1108 extends along and is positioned over and/or on top of the skin 1114 of the first wing 1104 when the first fence 1108 is in the stowed position. In other examples, the panel 1144 of the first fence 1108 can extend along and be recessed (e.g., fully or partially recessed) relative to the skin 1114 of the first wing 1104 when the first fence 1108 is in the stowed position. As shown in FIGS. 17-20, the panel 1144 of the first fence 1108 extends at an upward angle (e.g., vertically) away from the skin 1114 of the first wing 1104 when the first fence 1108 is in the deployed position. The panel 1144 of the first fence 1108 is configured to impact the airflow around the aircraft 1100 when the first fence 1108 is in the deployed position shown in FIGS. 17-20. For example, the panel 1144 can impede a spanwise airflow occurring along the spanwise direction 1118 of the first wing 1104 when the first fence 1108 is in the deployed position shown in FIGS. 17-20. As another example, the panel 1144 can initiate and/or generate a vortex along the first wing 1104 when the first fence 1108 is in the deployed position shown in FIGS. 17-20.

In the illustrated example of FIGS. 13-20, the panel 1144 of the first fence 1108 is planar. In other examples, the panel 1144 of the first fence 1108 can be non-planar. For example, the panel 1144 of the first fence 1108 can have a non-planar (e.g., curved) aerodynamic shape. In some examples, the non-planar aerodynamic shape can be configured to match and/or mimic a non-planar (e.g., curved) aerodynamic shape of the first wing 1104. In the illustrated example of FIGS. 13-20, the panel 1144 of the first fence 1108 has a trapezoidal shape between the first end 1302 of the base 1142 and the second end 1304 of the base 1142. In other examples, the panel 1144 of the first fence 1108 can have a different (e.g., non-trapezoidal) shape between the first end 1302 of the base 1142 and the second end 1304 of the base 1142. For example, the panel 1144 of the first fence 1108 can have any of a rectangular shape, a square shape, a triangular shape, a semicircular shape, a circular shape, or an elliptical shape, among others, between the first end 1302 of the base 1142 and the second end 1304 of the base 1142.

Figure 20:
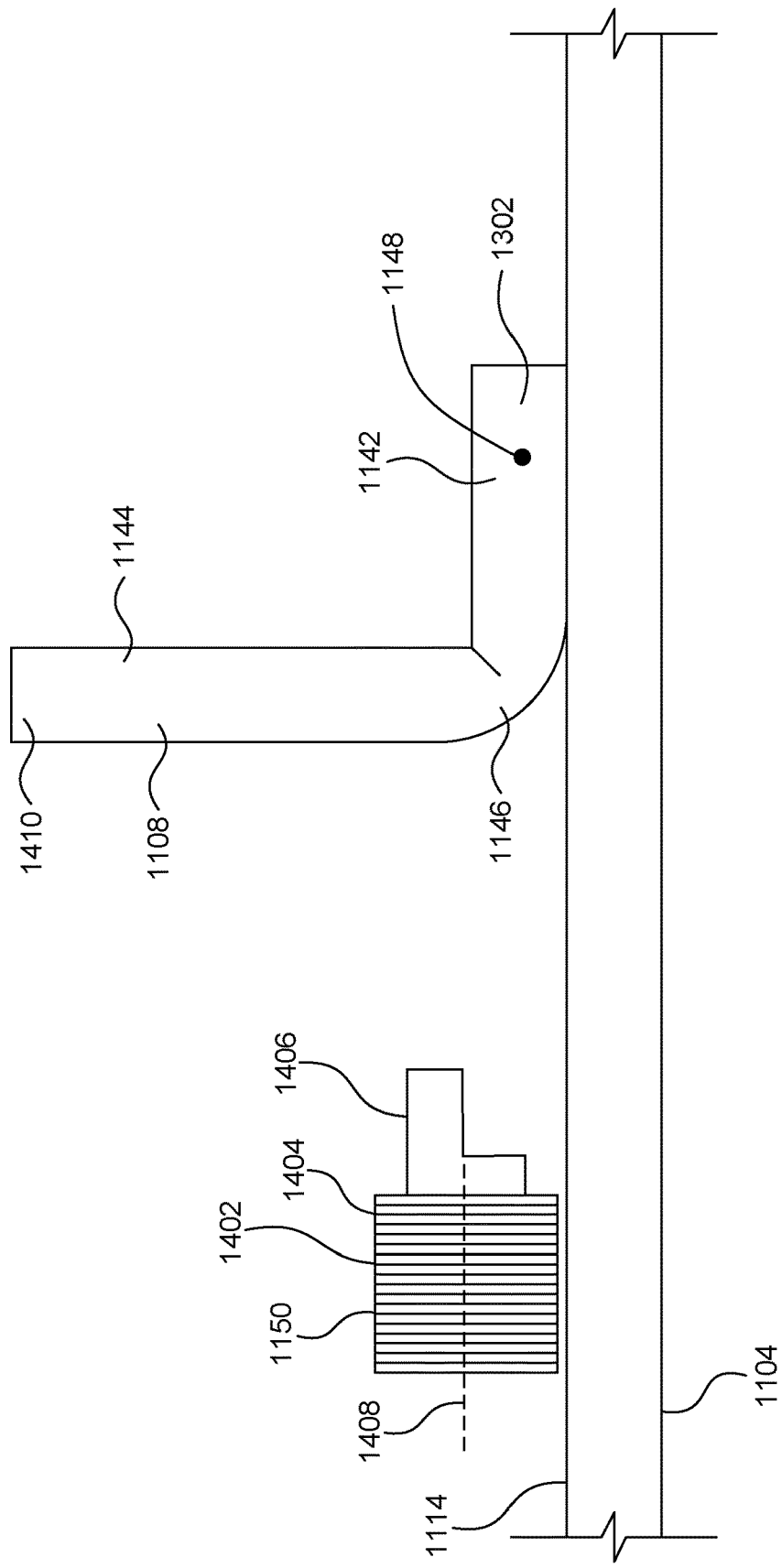
FIG. 20 is a frontal view of the first example fence of FIGS. 11-19 looking rearward along the example central axis of the example base, with the first fence in the example deployed position of FIGS. 12 and 17-19.

The panel 1144 of the first fence 1108 of FIGS. 13-20 is configured to move from the stowed position shown in FIGS. 13-16 to the deployed position shown in FIGS. 17-20 via the latching actuator 1150 and a biasing actuator associated with the first fence 1108. In the illustrated example of FIGS. 13-20, the living hinge 1146 of the first fence 1108 function(s) and/or operate(s) as a biasing actuator configured to move the panel 1144 of the first fence 1108 from the stowed position shown in FIGS. 13-16 to the deployed position shown in FIGS. 17-20, dependent upon the position and/or state of the latching actuator 1150. The living hinge 1146 of the first fence 1108 extends between the base 1142 of the first fence 1108 and the panel 1144 of the first fence 1108. As shown in FIGS. 16 and 20, the living hinge 1146 has a thickness that is less than a thickness of the base 1142, and less than a thickness of the panel 1144. The living hinge 1146 of the first fence 1108 is flexible, and biases the panel 1144 of the first fence 1108 to the deployed position shown in FIGS. 17-20. For example, the living hinge 1146 generates a restoring force (e.g., a biasing force) having a restoring force value. In the absence of the latching actuator 1150 engaging the panel 1144 of the first fence 1108, the restoring force generated by the living hinge 1146 moves the panel 1144 of the first fence 1108 to, and/or maintains the panel 1144 of the first fence 1108 in, the deployed position shown in FIGS. 17-20.

In the illustrated example of FIGS. 13-20, the living hinge 1146 is in a relatively less flexed and/or curved state when the panel 1144 of the first fence 1108 is in the stowed position shown in FIGS. 13-16 compared to when the panel 1144 of the first fence 1108 is in the deployed position shown in FIGS. 17-20. Conversely, the living hinge 1146 is in a relatively more flexed and/or curved state when the panel 1144 of the first fence 1108 is in the deployed position shown in FIGS. 17-20 compared to when the panel 1144 of the first fence 1108 is in the stowed position shown in FIGS. 13-16. Stated differently, the living hinge 1146 flexes, bends and/or curls away from the skin 1114 of the first wing 1104 as the panel 1144 of the first fence 1108 moves from the stowed position shown in FIGS. 13-16 to the deployed position shown in FIGS. 17-20, and the living hinge 1146 conversely unflexes, unbends and/or uncurls toward the skin 1114 of the first wing 1104 as the panel 1144 of the first fence 1108 moves from the deployed position shown in FIGS. 17-20 to the stowed position shown in FIGS. 13-16.

In the illustrated example of FIGS. 13-20, the latching actuator 1150 is implemented via an example electromechanical latch 1402 having an example solenoid 1404 and an example armature 1406 operatively coupled to the solenoid 1404. The armature 1406 and/or, more generally, the electromechanical latch 4102 has an example central axis 4108. The armature 1406 is movable (e.g., slidable and/or translatable) along the central axis 1408 via operation of the solenoid 1404. For example, the solenoid 1404 can cause the armature 1406 to move (e.g., retract) along the central axis 1408 from a first position (e.g., an engaged position) to a second position (e.g., a disengaged position) in response to a control signal (e.g., an electronic control signal) received at the solenoid 1404. In the illustrated example of FIGS. 13-20, the solenoid 1404, the armature 1406 and/or, more generally, the electromechanical latch 1402 has/have a trapezoidal cross-sectional shape configured to reduce drag along the first wing 1104. In other examples, the solenoid 1404, the armature 1406 and/or the electromechanical latch 1402 can have a shape and/or shapes that differ from that/those shown in FIGS. 13-20.

In the illustrated example of FIGS. 13-20, the solenoid 1404 and/or, more generally, the electromechanical latch 1402 causes the armature 1406 to engage an example lip 1410 of the panel 1144 of the first fence 1108 when the armature 1406 and/or, more generally, the electromechanical latch 1402 is in the first position. The engagement between the armature 1406 of the electromechanical latch 1402 and the lip 1410 of the panel 1144 maintains the panel 1144 and/or, more generally, the first fence 1108 in the stowed position shown in FIGS. 13-16. In response to a control signal (e.g., an electronic control signal) received at the solenoid 1404, the solenoid 1404 and/or, more generally, the electromechanical latch 1402 causes the armature 1406 to move (e.g., retract) along the central axis 1408 from the first position (e.g., an engaged position) to a second position (e.g., a disengaged position). The armature 1406 disengages and/or releases from the lip 1410 of the panel 1144 of the first fence 1108 when the armature 1406 and/or, more generally, the electromechanical latch 1402 is in the second position. The disengagement and/or release of the armature 1406 of the electromechanical latch 1402 from the lip 1410 of the panel 1144 enables the biasing actuator (e.g., the living hinge 1146 of the first fence 1108 of FIGS. 13-20 described above) to move the panel 1144 and/or, more generally, the first fence 1108 from the stowed position shown in FIGS. 13-16 to the deployed position shown in FIGS. 17-20. Thus, the biasing actuator is configured to move the panel 1144 of the first fence 1108 from the stowed position shown in FIGS. 13-16 to the deployed position shown in FIGS. 17-20 in response to the armature 1406 of the electromechanical latch 1402 being moved (e.g., retracted) from the first position (e.g., an engaged position) to the second position (e.g., a disengaged position).

In some examples, the armature 1406 of the electromechanical latch 1402 is configured to be maintained in the first position (e.g., an engaged position) shown in FIGS. 13-16 during a cruise operation of the aircraft 1100 having a first speed, and the armature 1406 of the electromechanical latch 1402 is further configured to move (e.g., to retract) from the first position (e.g., an engaged position) shown in FIGS. 13-16 to the second position (e.g., a disengaged position) shown in FIGS. 17-20 during a reduced speed operation (e.g., a takeoff or landing operation) of the aircraft 1100 having a second speed less than the first speed.

While FIGS. 13-20 and the descriptions thereof provided above are directed to the latching actuator 1150 being implemented as an electromechanical latch (e.g., electromechanical latch 1402) configured to change positions and/or states in response to receipt of a control signal (e.g., an electronic control signal), the latching actuator 1150 can be implemented in other forms including, for example, electrical, hydraulic, pneumatic, motor-driven, and/or shape memory alloy actuators. For example, the latching actuator 1150 can alternatively be implemented as a hydraulic latch configured to change positions and/or states in response to receipt of a pressurized hydraulic fluid. As another example, the latching actuator 1150 can alternatively be implemented as a pneumatic latch configured to change positions and/or states in response to receipt of pressurized air. As yet another example, the latching actuator 1150 can alternatively be implemented as a shape memory alloy configured to change positions, shapes and/or states in response to an application of heat.

Furthermore, while FIGS. 13-20 and the descriptions thereof provided above are directed to the biasing actuator of the first fence 1108 being implemented as a living hinge (e.g., living hinge 1146) configured to bias and/or move the panel of the first fence 1108 from the stowed position shown in FIGS. 13-16 to the deployed position shown in FIGS. 17-20, the biasing actuator of the first fence 1108 can be implemented in other forms including, for example, electrical, hydraulic, pneumatic, motor-driven, and/or shape memory alloy actuators. Moreover, while FIGS. 13-20 and the descriptions thereof provided above are directed to the first fence 1108 of FIGS. 11 and 12 that is coupled to the first wing 1104 of FIGS. 11 and 12, the informed reader will recognize that the second fence 1110 of FIGS. 11 and 12 that is coupled to the second wing 1106 of FIGS. 11 and 12 can be similarly implemented (e.g., in a manner that is mirrored about the longitudinal axis 1112 of the aircraft 1100). Moreover, while FIGS. 13-20 and the descriptions thereof provided above are directed to the first fence 1108 of FIGS. 11 and 12 that is coupled to the first wing 1104 of FIGS. 11 and 12, the informed reader will recognize that any number of additional fences can be similarly implemented on the first wing 1104.

Figure 21:
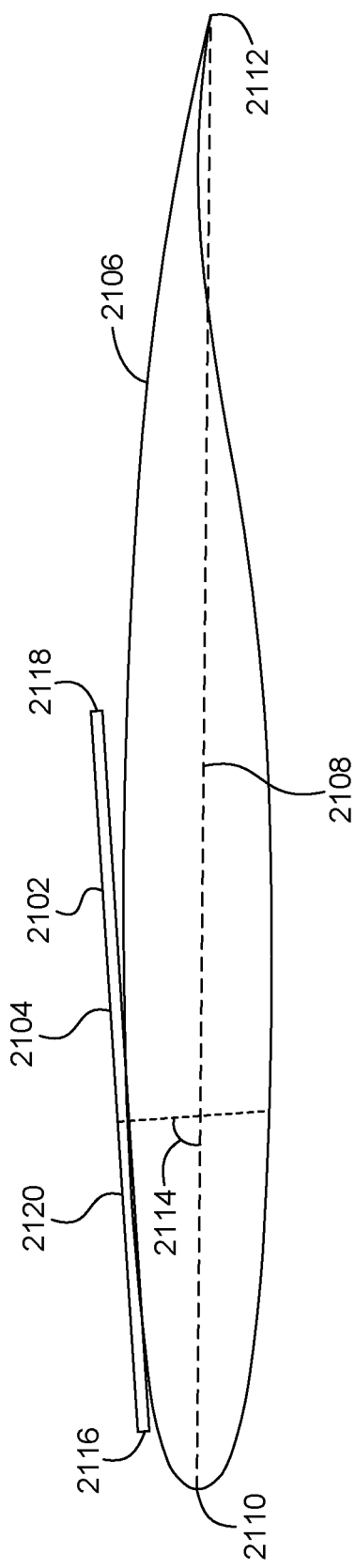
FIG. 21 is a cross-sectional view of an example fence having a single example planar panel positioned in an example stowed position relative to an example curved wing.

In some examples, implementing any of the above-described fences (e.g., the first fence 108 of FIGS. 1-10, the first fence 1108 of FIGS. 11-20, etc.) as a fence having a single, planar panel may in some instances become problematic with regard to stowing the fence along the skin of the wing of the aircraft, particularly when the wing is a curved wing having a substantial degree of curvature. For example, FIG. 21 is a cross-sectional view of an example fence 2102 having a single example planar panel 2104 positioned in an example stowed position relative to an example curved wing 2106. The curved wing 2106 has an example chord 2108 extending from an example leading edge 2110 of the curved wing 2106 to an example trailing edge 2112 of the curved wing 2106. The planar panel 2104 is oriented at an example angle 2114 relative to the chord 2108. The planar panel 2104 includes a first example end 2116 positioned toward the leading edge 2110 of the curved wing 2106, a second example end 2118 located opposite the first end 2116 and positioned toward the trailing edge 2112 of the curved wing 2106, and an example middle portion 2120 located between the first and second ends 2116, 2118 of the planar panel 2104.

As shown in FIG. 21, although the middle portion 2120 of the planar panel 2104 is adjacent the curved wing 2106 when the fence 2102 is in the stowed position, the curvature of the curved wing 2106 prevents the first and second ends 2116, 2118 of the planar panel 2104 from being adjacent the curved wing 2106. The illustrated spacing and/or separation between the first and second ends 2116, 2118 of the planar panel 2104 and the curved wing 2106 of FIG. 21 can result in undesirable aerodynamic performance penalties (e.g., drag) when the fence 2102 is in the stowed position. In some examples, such undesirable aerodynamic performance penalties can advantageously be reduced by alternatively implementing the fence 2102 of FIG. 21 as a fence having a plurality of planar panels.

Figure 22:
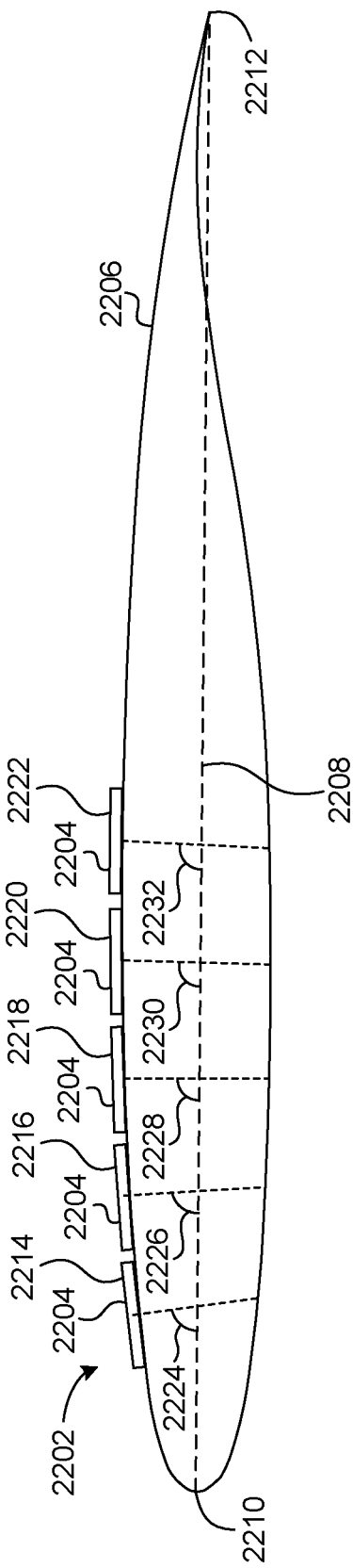
FIG. 22 is a cross-sectional view of an example fence having a plurality of example planar panels respectively positioned in corresponding example stowed positions relative to an example curved wing.

For example, FIG. 22 is a cross-sectional view of an example fence 2202 having a plurality of example planar panels 2204 respectively positioned in corresponding example stowed positions relative to an example curved wing 2206. The curved wing 2206 has an example chord 2208 extending from an example leading edge 2210 of the curved wing 2206 to an example trailing edge 2212 of the curved wing 2206. In the illustrated example of FIG. 22, the planar panels 2204 of the fence 2202 include a first example planar panel 2214, a second example planar panel 2216, a third example planar panel 2218, a fourth example planar panel 2220, and a fifth example planar panel 2222. In other examples, the fence 2202 can include a different number of planar panels (e.g., 2, 3, 4, 6, 8, 10, etc.).

The first planar panel 2214 of FIG. 22 is oriented at a first example angle 2224 relative to the chord 2208. The second planar panel 2216 of FIG. 22 is located aft of the first planar panel 2214 and is oriented at a second example angle 2226 relative to the chord 2208. The third planar panel 2218 of FIG. 22 is located aft of the second planar panel 2216 and is oriented at a third example angle 2228 relative to the chord 2208. The fourth planar panel 2220 of FIG. 22 is located aft of the third planar panel 2218 and is oriented at a fourth example angle 2230 relative to the chord 2208. The fifth planar panel 2222 of FIG. 22 is located aft of the fourth planar panel 2220 and is oriented at a fifth example angle 2232 relative to the chord 2208.

In the illustrated example of FIG. 22, some or all of the first, second, third, fourth and fifth angles 2224, 2226, 2228, 2230, 2232 differ from one another, with the differing angles corresponding to and/or being determined based on the respective local curvatures of the skin of the curved wing 2206 adjacent the respective locations of the first, second, third, fourth and fifth planar panels 2214, 2216, 2218, 2220, 2222. As a result, the first, second, third, fourth and fifth planar panels 2214, 2216, 2218, 2220, 2222 collectively match and or mimic the overall curvature of the curved wing 2206 when the first, second, third, fourth and fifth planar panels 2214, 2216, 2218, 2220, 2222 are in their respective stowed positions. For example, respective ones of the first, second, third, fourth and fifth planar panels 2214, 2216, 2218, 2220, 2222 of FIG. 22 demonstrate less separation from the curved wing 2206 compared to the separation demonstrated by the single planar panel 2104 relative to the curved wing 2106 of FIG. 21 described above. Such decreased separation in turn reduces the undesirable aerodynamic performance penalties that can be associated with implementing a fence having a single planar panel.

Figure 23:
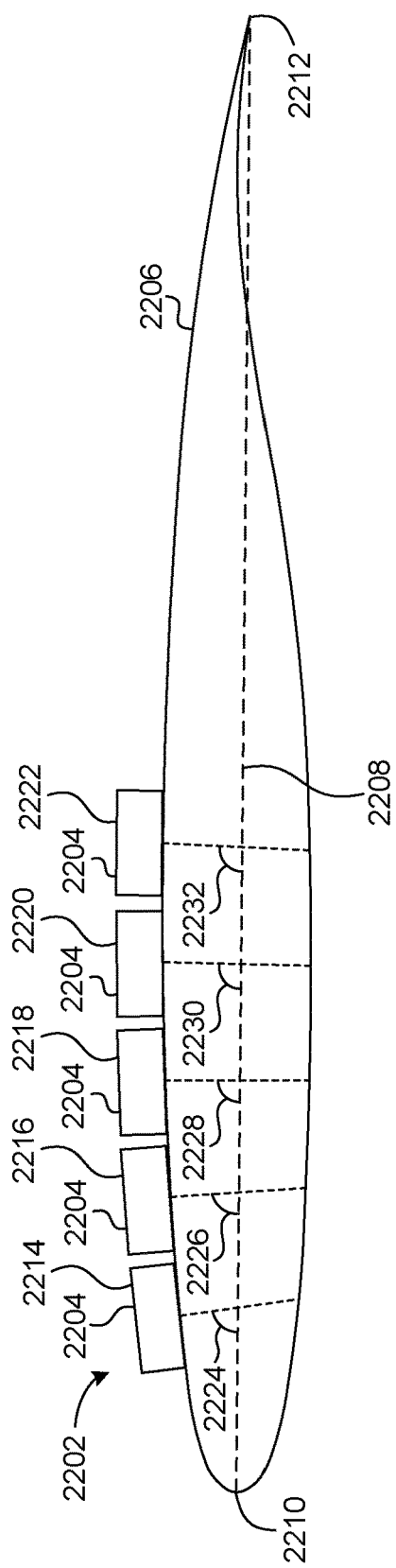
FIG. 23 is a cross-sectional view of the example fence of FIG. 22 having the plurality of example planar panels respectively positioned in corresponding example deployed positions relative to the example curved wing of FIG. 22.

FIG. 23 is a cross-sectional view of the example fence 2202 of FIG. 22 having the plurality of example planar panels 2204 (e.g., the first, second, third, fourth and fifth planar panels 2214, 2216, 2218, 2220, 2222) respectively positioned in corresponding example deployed positions relative to the example curved wing 2206 of FIG. 22. The first, second, third, fourth and fifth planar panels 2214, 2216, 2218, 2220, 2222 of the fence 2202 are individually and collectively configured to impede a spanwise airflow along the curved wing 2206 when the fence 2202 is in the deployed position of FIG. 23. In the illustrated example of FIGS. 22 and 23, each of the first, second, third, fourth and fifth planar panels 2214, 2216, 2218, 2220, 2222 of the fence 2202 may be individually movable and/or actuatable. For example, each of the first, second, third, fourth and fifth planar panels 2214, 2216, 2218, 2220, 2222 of the fence 2202 can be operatively coupled to a separate corresponding spring-loaded axle. The informed reader will recognize that respective ones of the corresponding spring-loaded axles may be implemented using the above-described spring-loaded axle 316 of FIGS. 3-10. As another example, each of the first, second, third, fourth and fifth planar panels 2214, 2216, 2218, 2220, 2222 of the fence 2202 can be operatively coupled to a separate corresponding living hinge and/or base. The informed reader will recognize that respective ones of the corresponding living hinges and/or bases may be implemented using the above-described living hinge 1146 and/or base 1142 of FIGS. 11-20.

Figure 24:
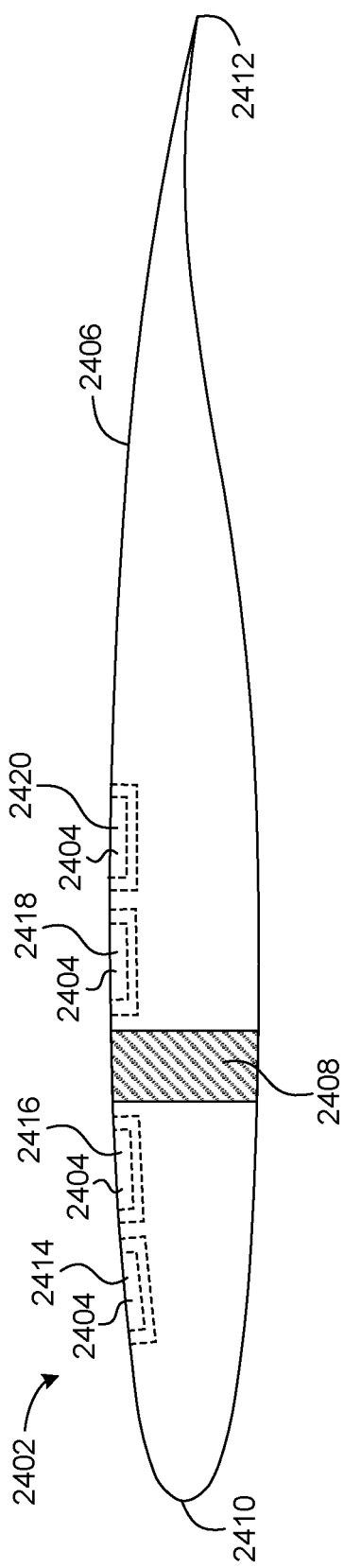
FIG. 24 is a cross-sectional view of an example fence having an example plurality of panels respectively positioned in corresponding example recessed stowed positions relative to an example curved wing.

In some examples, any of the above-described panel(s) and/or, more generally, any of the above-described fences (e.g., the first fence 108 of FIGS. 1-10, the first fence 1108 of FIGS. 11-20, the fence 2202 of FIGS. 22 and 23, etc.) can be implemented such that the panel and/or fence extends along and is recessed (e.g., fully or partially recessed) relative to the surrounding skin of the wing when the fence is in its stowed position. For example, FIG. 24 is a cross-sectional view of an example fence 2402 having a plurality of example panels 2404 respectively positioned in corresponding example recessed stowed positions relative to an example wing 2406. The wing 2406 includes an example supporting structure 2408 (e.g., a spar) located between an example leading edge 2410 and an example trailing edge 2412 of the wing 2406. In the illustrated example of FIG. 24, the panels 2404 of the fence 2402 include a first example panel 2414, a second example panel 2416, a third example panel 2418, and a fourth example panel 2420. The first panel 2414 is located forward of the supporting structure 2408. The second panel 2416 is located aft of the first panel 2414 and forward of the supporting structure 2408. The third panel 2418 is located aft of the second panel 2416 and aft of the supporting structure 2408. The fourth panel 2420 is located aft of the third panel 2418 and aft of the supporting structure 2408. In other examples, the fence 2402 can include a different number of panels (e.g., 2, 3, 5, 6, 8, 10, etc.), and the panels may be arranged at different locations relative to the supporting structure 2408.

As shown in FIG. 24, each of the first, second, third and fourth panels 2414, 2416, 2418, 2420 has a respective stowed position in which the panel of the fence 2402 is recessed within the wing 2406 (e.g., recessed relative to the skin of the wing 2406). In some examples, each of the first, second, third and fourth panels 2414, 2416, 2418, 2420 can respectively be recessed within the wing 2406 such that the panel, as well as any axle(s), axle mount(s), spring(s), living hinge(s) and/or base(s) coupled to the panel and/or, more generally, coupled to the fence 2402, is/are recessed (e.g., fully or partially recessed) relative to the surrounding skin of the wing 2406 when the fence 2402 is in its stowed position. Recessing such components within the wing 2406 can further reduce drag associated with the fence 2402 when the fence 2402 is stowed.

Figure 25:
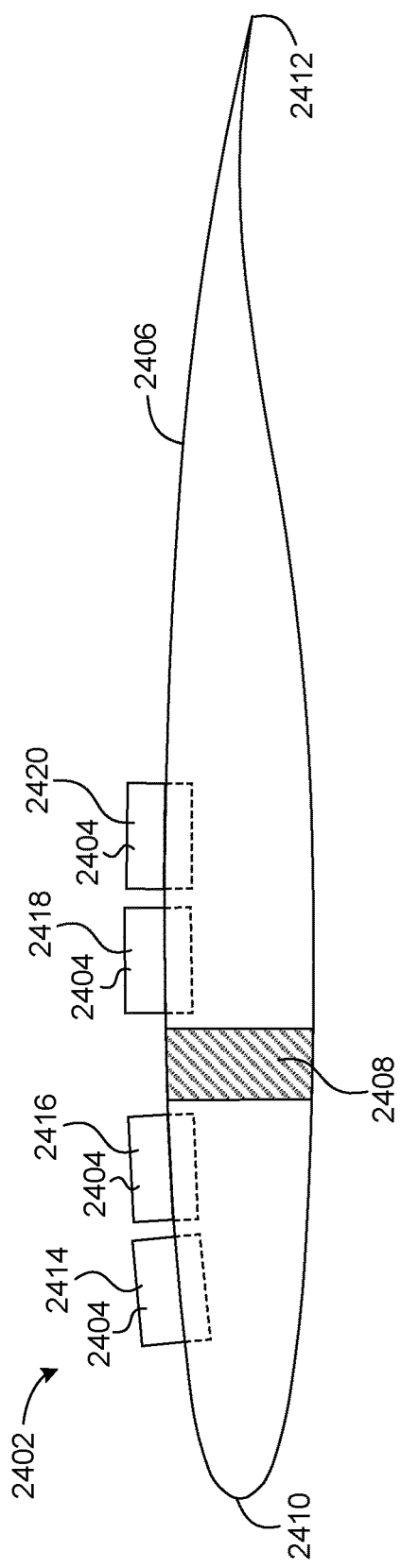
FIG. 25 is a cross-sectional view of the example fence of FIG. 24 having the example plurality of panels respectively positioned in corresponding example deployed positions relative to the example curved wing of FIG. 24.

FIG. 25 is a cross-sectional view of the example fence 2402 of FIG. 24 having the plurality of example panels 2404 respectively positioned in corresponding example deployed positions relative to the example wing 2406 of FIG. 24. As shown in FIG. 25, each of the first, second, third and fourth panels 2414, 2416, 2418, 2420 has a respective deployed position in which the panel of the fence 2402 extends upwardly from the wing 2406 (e.g., extends upwardly relative to the skin of the wing 2406). In some examples, the fence 2402 of FIGS. 24 and 25 can further include a non-recessed panel positioned over the supporting structure 2408 of the wing 2406. In still other examples, the fence 2402 of FIGS. 24 and 25 can additionally or alternatively include one or more non-recessed panel(s) located at the leading edge 2410 and/or at the trailing edge 2412 of the wing 2406.

Figure 26:
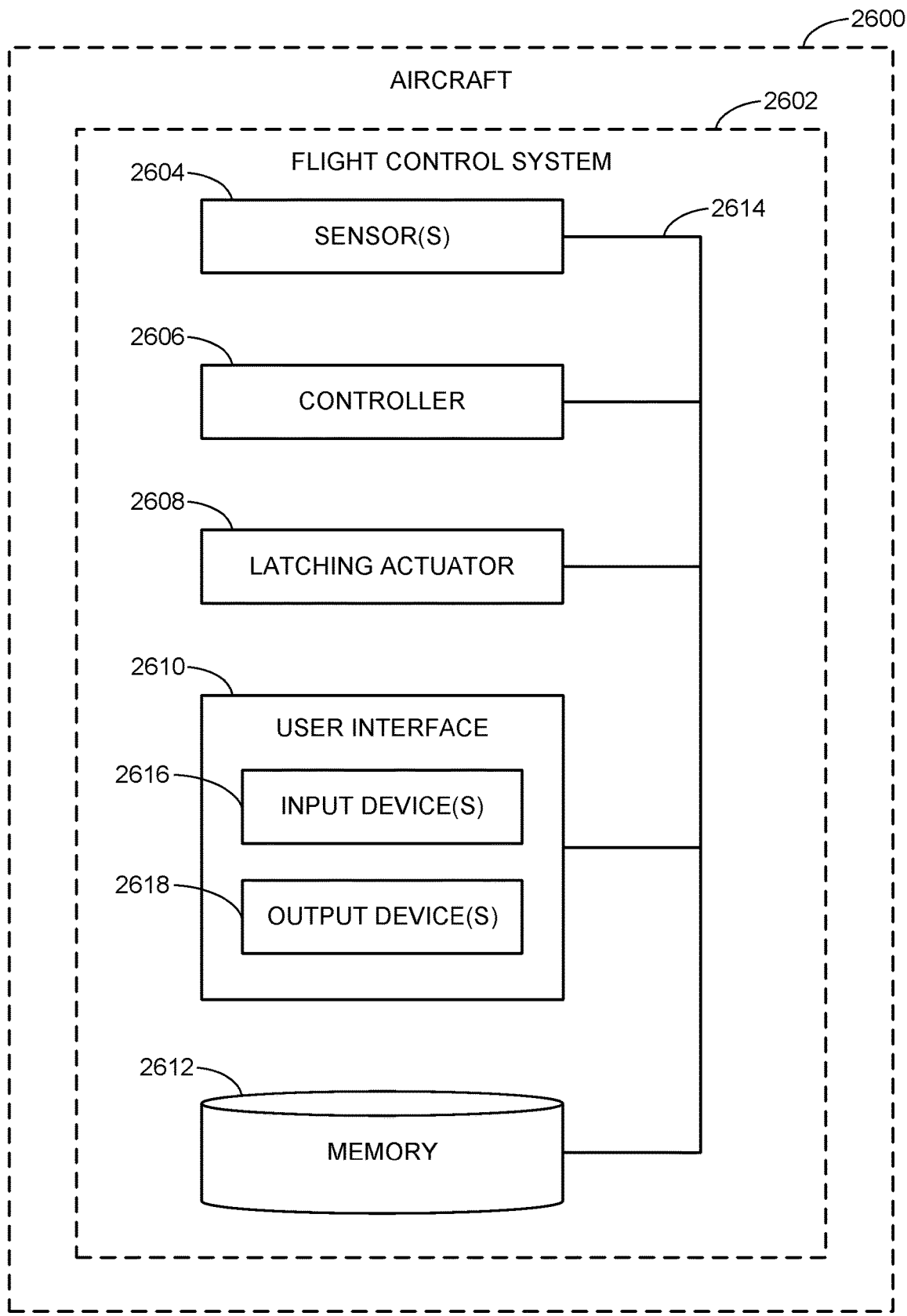
FIG. 26 is a block diagram of an example flight control system of an example aircraft that can be implemented in accordance with teachings of this disclosure to control example automated deployable fences.

FIG. 26 is a block diagram of an example flight control system 2602 of an example aircraft 2600 that can be implemented in accordance with teachings of this disclosure to control the above-described example automated deployable fences (e.g., the first fence 108 of FIGS. 1-10, the first fence 1108 of FIGS. 11-20, the fence 2202 of FIGS. 22 and 23, the fence 2402 of FIGS. 24 and 25, etc.). The aircraft 2600 of FIG. 26 can be implemented, for example, as the aircraft 100 of FIGS. 1 and 2, or as the aircraft 1100 of FIGS. 11 and 12. The flight control system 2602 of the aircraft 2600 can be mounted on and/or within, and/or otherwise coupled to, one or more structural component(s) (e.g., a fuselage, a wing, etc.) of the aircraft 2600. In the illustrated example of FIG. 26, the flight control system 2602 includes one or more example sensor(s) 2604, an example controller 2606, an example latching actuator 2608, an example user interface 2610, an example memory 2612, and an example communication bus 2614. The user interface 2610 of FIG. 26 includes one or more example input device(s) 2616 and one or more example output device(s) 2618. However, other example implementations of the flight control system 2602 may include fewer or additional structures.

In the illustrated example of FIG. 26, the sensor(s) 2604, the controller 2606, the latching actuator 2608, the user interface 2610 (including the input device(s) 2616 and the output device(s) 2618), and/or the memory 2612 are operatively coupled (e.g., in electrical communication) via the communication bus 2614. Other example implementations of the flight control system 2602 may cause the sensor(s) 2604, the controller 2606, the latching actuator 2608, the user interface 2610 (including the input device(s) 2616 and the output device(s) 2618), and/or the memory 2612 to be operatively coupled in a different manner.

The sensor(s) 2604 of FIG. 26 can be implemented via one or more sensor(s) configured to detect, sense and/or measure one or more operational characteristic(s) (e.g., operational characteristic data) associated with the aircraft 2600 of FIG. 26. For example, one or more of the sensor(s) 2604 can be configured to detect, sense and/or measure airspeed data corresponding to an airspeed of the aircraft 2600. As another example, one or more of the sensor(s) 2604 can be configured to detect, sense and/or measure angle of attack data corresponding to an angle of attack of the aircraft 2600. As yet another example, one or more of the sensor(s) 2604 can be configured to detect, sense and/or measure airflow angle data corresponding to an airflow angle associated with the aircraft 2600. In some examples, respective ones of the sensor(s) 2604 of FIG. 26 can include a transducer to convert the operational characteristic(s) detected and/or sensed by and/or at the sensor 2604 into one or more corresponding electrical signal(s) to be measured by and/or at the sensor 2604, and/or to be processed and/or analyzed by and/or at the controller 2606 of FIG. 26 described below. Data carried by, identified and/or derived from the operational characteristic(s) detected, sensed and/or measured by the sensor(s) 2604 of FIG. 26 may be of any quantity, type, form and/or format, and may be stored in a computer-readable storage medium such as the memory 2612 of FIG. 26 described below.

The controller 2606 of FIG. 26 manages and/or controls the operations of the sensor(s) 2604, the latching actuator 2608, the user interface 2610 (including the input device(s) 2616 and the output device(s) 2618), the memory 2612 and/or, more generally, the flight control system 2602 of FIG. 26. The controller 2606 can be implemented via any type(s) and/or any number(s) of semiconductor device(s) (e.g., microprocessor(s), microcontroller(s), etc.). The controller 2606 of FIG. 26 compares operational characteristic data (e.g., as detected, sensed and/or measured by the sensor(s) 2604 of FIG. 26) to one or more threshold(s) (e.g., an airspeed threshold, an angle of attack threshold, an airflow angle threshold, etc.) to determine whether the operational characteristic data violates and/or fails to satisfy the threshold(s). In some examples, the controller 2606 determines that a violation and/or satisfaction failure has occurred when the operational characteristic data exceeds a threshold corresponding to an allowable maximum for the operational characteristic data. In other examples, the controller 2606 determines that a violation and/or satisfaction failure has occurred when the operational characteristic data falls below a threshold corresponding to an allowable minimum for the operational characteristic data. Threshold data corresponding to one or more threshold(s) to be implemented, invoked, evaluated and/or processed by and/or at the controller 2606 may be of any quantity, type, form and/or format, and may be stored in a computer-readable storage medium such as the memory 2612 of FIG. 26 described below. Furthermore, threshold evaluation data (e.g., data resulting from comparing operational characteristic data to threshold data) to be implemented, invoked, evaluated and/or processed by and/or at the controller 2606 may be of any quantity, type, form and/or format, and may be stored in a computer-readable storage medium such as the memory 2612 of FIG. 26 described below.

The controller 2606 of FIG. 26 transmits, and/or causes the transmission of, one or more control signal(s) to the latching actuator 2608 of FIG. 26 in response to the controller 2606 determining that the operational characteristic data violates and/or fails to satisfy one or more of the threshold(s). In some examples, the controller 2606 additionally or alternatively transmits, and/or causes the transmission of, one or more control signal(s) to the latching actuator 2608 of FIG. 26 in response to the controller 2606 receiving one or more actuation command(s) from the user interface 2610 of FIG. 26 described below. The control signal(s) transmitted via the controller 2606 cause(s) the latching actuator 2608 to move from a first position (e.g., an engaged position) in which the latching actuator 2608 maintains a deployable fence of the aircraft 2600 in a stowed position, and a second position (e.g., a disengaged position) in which the latching actuator 2608 releases the corresponding deployable fence of the aircraft 2600 from the stowed position. Control signal data corresponding to one or more control signal(s), command(s), instruction(s), etc. to be implemented, invoked and/or executed by and/or at the controller 2606 may be of any quantity, type, form and/or format, and may be stored in a computer-readable storage medium such as the memory 2612 of FIG. 26 described below.

The latching actuator 2608 of FIG. 26 can be implemented, for example, as one or more of the latching actuator(s) 148, 156 of the aircraft 100 of FIGS. 1-10 (e.g., including the electromechanical latch 402 of FIGS. 4-10), or as the one or more of the latching actuator(s) 1150, 1160 of the aircraft 1100 of FIGS. 11-20 (e.g., including the electromechanical latch 1402 of FIGS. 14-20). In the illustrated example of FIG. 26, the latching actuator 2608 is movable between a first position (e.g., an engaged position) in which the latching actuator 2608 maintains a corresponding deployable fence of the aircraft 2600 in a stowed position, and a second position (e.g., a disengaged position) in which the latching actuator 2608 releases the corresponding deployable fence of the aircraft 2600 from the stowed position. The latching actuator 2608 of FIG. 26 is configured to move from the first position (e.g., engaged position) to the second position (e.g., disengaged position) in response to one or more control signal(s) (e.g., one or more electronic control signal(s)) received at the latching actuator 2608 from the controller 2606 of the flight control system 2602 of FIG. 26.

The user interface 2610 of FIG. 26 facilitates interactions and/or communications between an end user (e.g., a pilot) and the flight control system 2602. The user interface 2610 includes one or more input device(s) 2616 via which the user may input information and/or data to the flight control system 2602. For example, the user interface 2610 may be a button, a switch, a lever, and/or a touchscreen that enable(s) the user to convey data and/or commands (e.g., one or more actuation command(s)) to the controller 2606 of FIG. 26 described above, and/or, more generally, to the flight control system 2602 of FIG. 26. The user interface 2610 of FIG. 26 also includes one or more output device(s) 2618 via which the user interface 2610 presents information and/or data in visual and/or audible form to the user. For example, the user interface 2610 may include a light emitting diode, a touchscreen, and/or a liquid crystal display for presenting visual information, and/or a speaker for presenting audible information. In some examples, the output device(s) 2618 can present data corresponding to the operational characteristic data detected, sensed and/or measured by the sensor(s) 2604 of FIG. 26. Data and/or information that is presented and/or received via the user interface 2610 of FIG. 26 may be of any type, form and/or format, and may be stored in a computer-readable storage medium such as the memory 2612 of FIG. 26 described below.

The memory 2612 of FIG. 26 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 2612 of FIG. 26 can be stored in any file and/or data structure format, organization scheme, and/or arrangement.

In some examples, the memory 2612 of FIG. 26 stores operational characteristic data (e.g., airspeed data, angle of attack data, airflow angle data, etc.) detected, sensed and/or measured by the sensor(s) 2604 of FIG. 26. In some examples, the memory 2612 stores threshold data (e.g., an airspeed threshold, an angle of attack threshold, an airflow angle threshold, etc.) to be accessed and/or obtained by the controller 2606 of FIG. 2. In some examples, the memory 2612 stores threshold evaluation data (e.g., data resulting from comparing operational data to threshold data) determined and/or calculated by and/or at the controller 2606 of FIG. 26. In some examples, the memory 2612 stores control signal data to be transmitted to the latching actuator 2608 of FIG. 26. In some examples, the memory 2612 stores actuation command data generated via the user interface 2610 of FIG. 26. The memory 2612 of FIG. 26 is accessible (e.g., via the communication bus 2614 of FIG. 26) to one or more of the sensor(s) 2604, the controller 2606, the latching actuator 2608 and/or the user interface 2610 (including the input device(s) 2616 and the output device(s) 2618) of FIG. 26, and/or, more generally, to the flight control system 2602 of FIG. 26.

While an example manner of implementing the flight control system 2602 is illustrated in FIG. 26 one or more of the elements, processes and/or devices illustrated in FIG. 26 may be combined, divided, re-arranged, omitted, eliminated and/or implemented in any other way. Further, the example sensor(s) 2604, the example controller 2606, the example latching actuator 2608, the example user interface 2610 (including the example input device(s) 2616 and the example output device(s) 2618), the example memory 2612, the example communication bus 2614 and/or, more generally, the example flight control system 2602 of FIG. 26 may be implemented by hardware, software, firmware and/or any combination of hardware, software and/or firmware. Thus, for example, any of the example sensor(s) 2604, the example controller 2606, the example latching actuator 2608, the example user interface 2610 (including the example input device(s) 2616 and the example output device(s) 2618), the example memory 2612, the example communication bus 2614 and/or, more generally, the example flight control system 2602 of FIG. 26 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor(s) 2604, the example controller 2606, the example latching actuator 2608, the example user interface 2610 (including the example input device(s) 2616 and the example output device(s) 2618), and/or the example memory 2612 of FIG. 26 is/are hereby expressly defined to include a non-transitory computer readable storage device or storage disk such as a memory, a digital versatile disk (DVD), a compact disk (CD), a Blu-ray disk, etc. including the software and/or firmware. Further still, the example sensor(s) 2604, the example controller 2606, the example latching actuator 2608, the example user interface 2610 (including the example input device(s) 2616 and the example output device(s) 2618), the example memory 2612, the example communication bus 2614 and/or, more generally, the example flight control system 2602 of FIG. 26 may include one or more elements, processes and/or devices in addition to, or instead of, those illustrated in FIG. 26, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

From the foregoing, it will be appreciated that example automated (e.g., controllable) deployable fences for aircraft wings have been disclosed. Unlike the conventional fences and/or other countermeasures described above, the example deployable fences disclosed herein are automated (e.g., controllable) via a latching actuator and a biasing actuator. In some disclosed examples, a deployable fence is coupled (e.g., rotatably coupled) to a wing of an aircraft such that the fence is movable relative to the wing between a stowed position in which a panel of the fence extends along a skin of the wing, and a deployed position in which the panel extends at an upward angle away from the skin. The panel is configured to impact the airflow around the aircraft when the fence is in the deployed position. For example, the panel can impede a spanwise airflow along the wing when the fence is in the deployed position. As another example, the panel can initiate and/or generate a vortex along the wing when the fence is in the deployed position. In some disclosed examples, a latching actuator is movable between a first position in which the latching actuator maintains the fence in the stowed position, and a second position in which the latching actuator releases the fence from the stowed position. The latching actuator is configured to move from the first position to the second position in response to a control signal (e.g., an electronic control signal) received at the latching actuator. In some disclosed examples, a biasing actuator is configured to move the fence from the stowed position to the deployed position in response to the latching actuator being moved from the first position to the second position.

The example automated (e.g., controllable) deployable fences disclosed herein provide numerous advantages over the conventional fences described above. For example, the movability (e.g., movement from a deployed position to a stowed position) of the automated deployable fences disclosed herein advantageously reduces undesirable aerodynamic performance penalties (e.g., drag) during high-speed operation of the aircraft (e.g., during cruise). As another example, the automated deployable fences disclosed herein provide a stowed position for the fence whereby the fence extends along the skin of the wing (as opposed to vertically within the wing), thereby advantageously increasing the amount of unused space within the wing relative to the amount of space that may otherwise be consumed by the in-wing mechanical linkages associated with the above-described vertically-deployable conventional fences. As yet another example, the automated deployable fences disclosed herein facilitate pilot-free operation (e.g., deployment and retraction) of the fences, which advantageously ensures that the fences are deployed and/or retracted at the appropriate time(s) and/or under the appropriate flight condition(s).

In some examples, an apparatus is disclosed. In some disclosed examples, the apparatus comprises a fence, a latching actuator, and a biasing actuator. In some disclosed examples, the fence is coupled to a wing of an aircraft. In some disclosed examples, the fence is movable relative to the wing between a stowed position in which a panel of the fence extends along a skin of the wing, and a deployed position in which the panel extends at an upward angle away from the skin. In some disclosed examples, the panel is configured to impede a spanwise airflow along the wing when the fence is in the deployed position. In some disclosed examples, the latching actuator is movable between a first position in which the latching actuator maintains the fence in the stowed position, and a second position in which the latching actuator releases the fence from the stowed position. In some disclosed examples, the latching actuator is configured to move from the first position to the second position in response to a control signal received at the latching actuator. In some disclosed examples, the biasing actuator is configured to move the fence from the stowed position to the deployed position in response to the latching actuator being moved from the first position to the second position.

In some disclosed examples, the latching actuator comprises an electromechanical latch having a solenoid and an armature operatively coupled to the solenoid. In some disclosed examples, the solenoid is configured to cause the armature, in response to the control signal, to move from a first position in which the armature maintains the fence in the stowed position to a second position in which the armature releases the fence from the stowed position.

In some disclosed examples, the electromechanical latch has a trapezoidal cross-sectional shape.

In some disclosed examples, the electromechanical latch is configured to engage the armature with a lip of the panel when the armature is in the first position and the fence is in the stowed position. In some disclosed examples, the engaging maintains the fence in the stowed position. In some disclosed examples, the electromechanical latch is configured to disengage the armature from the lip of the panel when the armature is in the second position. In some disclosed examples, the disengaging releases the fence from the stowed position and enables the fence to move from the stowed position to the deployed position.

In some disclosed examples, the latching actuator is configured to receive the control signal from a controller of a flight control system of the aircraft. In some disclosed examples, the flight control system includes a sensor configured to detect an operational characteristic of the aircraft. In some disclosed examples, the operational characteristic includes at least one of an airspeed, an angle of attack, or an airflow angle.

In some disclosed examples, the controller is configured to transmit the control signal to the latching actuator in response to the controller determining that the operational characteristic fails to satisfy a threshold.

In some disclosed examples, the flight control system includes a user interface configured to present data corresponding to the operational characteristic detected by the sensor. In some disclosed examples, the controller is configured to transmit the control signal to the latching actuator in response to the controller receiving an actuation command from the user interface of the flight control system.

In some disclosed examples, the biasing actuator comprises a spring-loaded axle operatively coupled to the fence and mounted to the wing. In some disclosed examples, the spring-loaded axle includes an axle and a spring coiled around the axle. In some disclosed examples, the axle has a central axis. In some disclosed examples, the spring-loaded axle is configured to move the fence from the stowed position to the deployed position. In some disclosed examples, the central axis is substantially parallel to a chordwise direction of the wing. In some disclosed examples, the panel extends in an inboard direction away from the central axis when the fence is in the stowed position.

In some disclosed examples, the biasing actuator comprises a living hinge extending between the panel of the fence and a base of the fence. In some disclosed examples, the base is mounted to the wing. In some disclosed examples, the base has a central axis. In some disclosed examples, the living hinge is configured to move the panel of the fence relative to the base of the fence and relative to the wing from the stowed position to the deployed position. In some disclosed examples, the central axis is substantially parallel to a chordwise direction of the wing. In some disclosed examples, the panel extends in an inboard direction away from the central axis when the fence is in the stowed position.

In some disclosed examples, the panel is recessed within the wing when the fence is in the stowed position.

In some examples, a method for moving a fence coupled to a wing of an aircraft is disclosed. In some disclosed examples, the method comprises moving the fence between a stowed position in which a panel of the fence extends along a skin of the wing, and a deployed position in which the panel extends at an upward angle away from the skin. In some disclosed examples, the panel impedes a spanwise airflow along the wing when the fence is in the deployed position. In some disclosed examples, the moving the fence includes moving a latching actuator from (a) a first position in which the latching actuator maintains the fence in the stowed position to (b) a second position in which the latching actuator releases the fence from the stowed position. In some disclosed examples, the moving the latching actuator is in response to a control signal received at the latching actuator. In some disclosed examples, the moving of the fence includes moving the fence from the stowed position to the deployed position via a biasing actuator in response to the moving the latching actuator from the first position to the second position.

In some disclosed examples, the latching actuator comprises an electromechanical latch having a solenoid and an armature operatively coupled to the solenoid. In some disclosed examples, the moving the latching actuator includes moving the armature, via the solenoid and in response to the control signal, from a first position in which the armature maintains the fence in the stowed position to a second position in which the armature releases the fence from the stowed position.

In some disclosed examples, the method further comprises engaging the armature with a lip of the panel when the armature is in the first position and the fence is in the stowed position. In some disclosed examples, the engaging maintains the fence in the stowed position. In some disclosed examples, the method further comprises disengaging the armature from the lip of the panel when the armature is in the second position. In some disclosed examples, the disengaging releases the fence from the stowed position and enables the fence to move from the stowed position to the deployed position.

In some disclosed examples, the method further comprises receiving the control signal at the latching actuator from a controller of a flight control system of the aircraft. In some disclosed examples, the flight control system includes a sensor configured to detect an operational characteristic of the aircraft. In some disclosed examples, the operational characteristic includes at least one of an airspeed, an angle of attack, or an airflow angle.

In some disclosed examples, the method further comprises transmitting the control signal from the controller to the latching actuator in response to the controller determining that the operational characteristic fails to satisfy a threshold.

In some disclosed examples, the flight control system includes a user interface configured to present data corresponding to the operational characteristic detected by the sensor, and the method further comprises transmitting the control signal from the controller to the latching actuator in response to the controller receiving an actuation command from the user interface of the flight control system Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a fence coupled to a wing of an aircraft, the fence being movable relative to the wing between a stowed position in which a panel of the fence extends along a skin of the wing, and a deployed position in which the panel extends at an upward angle away from the skin, the panel configured to impede a spanwise airflow along the wing when the fence is in the deployed position;
an electromechanical latch including a solenoid and an armature operatively coupled to the solenoid, the solenoid configured to cause the armature, in response to a control signal received at the electromechanical latch, to move from a first position in which the armature maintains the fence in the stowed position to a second position in which the armature releases the fence from the stowed position, the armature configured to:
engage a lip of the panel when the armature is in the first position and the fence is in the stowed position, wherein the engaging maintains the fence in the stowed position; and
disengage from the lip of the panel when the armature is in the second position, wherein the disengaging releases the fence from the stowed position and enables the fence to move from the stowed position to the deployed position; and
a biasing actuator configured to move the fence from the stowed position to the deployed position in response to the armature being moved from the first position to the second position.

2. The apparatus of claim 1, wherein the electromechanical latch has a trapezoidal cross-sectional shape.

3. The apparatus of claim 1, wherein the electromechanical latch is configured to receive the control signal from a controller of a flight control system of the aircraft, the flight control system including a sensor configured to detect an operational characteristic of the aircraft.

4. The apparatus of claim 3, wherein the operational characteristic includes at least one of an airspeed, an angle of attack, or an airflow angle.

5. The apparatus of claim 3, wherein the controller is configured to transmit the control signal to the electromechanical latch in response to the controller determining that the operational characteristic fails to satisfy a threshold.

6. The apparatus of claim 3, wherein the flight control system includes a user interface configured to present data corresponding to the operational characteristic detected by the sensor, and wherein the controller is configured to transmit the control signal to the electromechanical latch in response to the controller receiving an actuation command from the user interface of the flight control system.

7. The apparatus of claim 1, wherein the biasing actuator comprises a spring-loaded axle operatively coupled to the fence and mounted to the wing, the spring-loaded axle including an axle and a spring coiled around the axle, the axle having a central axis, the spring-loaded axle configured to move the fence from the stowed position to the deployed position.

8. The apparatus of claim 7, wherein the central axis is substantially parallel to a chordwise direction of the wing, and wherein the panel extends in an inboard direction away from the central axis when the fence is in the stowed position.

9. The apparatus of claim 1, wherein the biasing actuator comprises a living hinge extending between the panel of the fence and a base of the fence, the base being mounted to the wing, the base having a central axis, the living hinge configured to move the panel of the fence relative to the base of the fence and relative to the wing from the stowed position to the deployed position.

10. The apparatus of claim 9, wherein the central axis is substantially parallel to a chordwise direction of the wing, and wherein the panel extends in an inboard direction away from the central axis when the fence is in the stowed position.

11. The apparatus of claim 1, wherein the panel is recessed within the wing when the fence is in the stowed position.

12. A method for moving a fence coupled to a wing of an aircraft, the method comprising:
moving the fence between a stowed position in which a panel of the fence extends along a skin of the wing, and a deployed position in which the panel extends at an upward angle away from the skin, the panel impeding a spanwise airflow along the wing when the fence is in the deployed position, the moving of the fence including:
moving an armature of an electromechanical latch, via a solenoid of the electromechanical latch operatively coupled to the armature, from (a) a first position in which the armature maintains the fence in the stowed position to (b) a second position in which the armature releases the fence from the stowed position, the moving of the armature being in response to a control signal received at the electromechanical latch, wherein the armature engages a lip of the panel when the armature is in the first position and the fence is in the stowed position, the engaging maintaining the fence in the stowed position, and wherein the armature disengages from the lip of the panel when the armature is in the second position, the disengaging releasing the fence from the stowed position and enables the fence to move from the stowed position to the deployed position; and moving the fence from the stowed position to the deployed position via a biasing actuator in response to the moving of the armature from the first position to the second position.

13. The method of claim 12, further comprising receiving the control signal at the electromechanical latch from a controller of a flight control system of the aircraft, the flight control system including a sensor configured to detect an operational characteristic of the aircraft.

14. The method of claim 13, wherein the operational characteristic includes at least one of an airspeed, an angle of attack, or an airflow angle.

15. The method of claim 13, further comprising transmitting the control signal from the controller to the electromechanical latch in response to the controller determining that the operational characteristic fails to satisfy a threshold.

16. The method of claim 13, wherein the flight control system includes a user interface configured to present data corresponding to the operational characteristic detected by the sensor, and wherein the method further comprises transmitting the control signal from the controller to the electromechanical latch in response to the controller receiving an actuation command from the user interface of the flight control system.

17. The method of claim 12, wherein the biasing actuator comprises a spring-loaded axle operatively coupled to the fence and mounted to the wing, the spring-loaded axle including an axle and a spring coiled around the axle, the axle having a central axis, the spring-loaded axle moving the fence from the stowed position to the deployed position in response to the moving of the armature from the first position to the second position.

18. The method of claim 17, wherein the central axis is substantially parallel to a chordwise direction of the wing, and wherein the panel extends in an inboard direction away from the central axis when the fence is in the stowed position.

19. The method of claim 12, wherein the biasing actuator comprises a living hinge extending between the panel of the fence and a base of the fence, the base being mounted to the wing, the base having a central axis, the living hinge moving the panel of the fence relative to the base of the fence and relative to the wing from the stowed position to the deployed position in response to the moving of the armature from the first position to the second position.

20. The method of claim 19, wherein the central axis is substantially parallel to a chordwise direction of the wing, and wherein the panel extends in an inboard direction away from the central axis when the fence is in the stowed position.

* * * * *